US012654049B2

(12) United States Patent
Williams

(10) Patent No.: US 12,654,049 B2
(45) Date of Patent: Jun. 16, 2026

(54) SYSTEMS AND METHODS OF FLOW CONTROL VALVES WITH MANIFOLDS

(71) Applicant: TYCO FIRE PRODUCTS LP, Lansdale, PA (US)

(72) Inventor: James O. Williams, Marlborough, MA (US)

(73) Assignee: Tyco Fire Products LP, Cranston, RI (US)

( * ) Notice: Subject to any disclaimer, the term of this patent is extended or adjusted under 35 U.S.C. 154(b) by 895 days.

(21) Appl. No.: 17/910,628

(22) PCT Filed: Mar. 24, 2021

(86) PCT No.: PCT/IB2021/052457
§ 371 (c)(1),
(2) Date: Sep. 9, 2022

(87) PCT Pub. No.: WO2021/191825
PCT Pub. Date: Sep. 30, 2021

(65) Prior Publication Data
US 2023/0134915 A1 May 4, 2023

Related U.S. Application Data

(60) Provisional application No. 62/994,440, filed on Mar. 25, 2020, provisional application No. 62/994,439, filed on Mar. 25, 2020.

(51) Int. Cl.
*A62C 35/68* (2006.01)
*F16K 27/02* (2006.01)
(Continued)

(52) U.S. Cl.
CPC .......... *A62C 35/68* (2013.01); *F16K 27/0236* (2013.01); *F16K 31/365* (2013.01); *F16K 37/0091* (2013.01)

(58) Field of Classification Search
CPC ... A62C 35/68; F16K 27/0236; F16K 31/365; F16K 37/0091
(Continued)

(56) References Cited

U.S. PATENT DOCUMENTS 11,047,491 B2    6/2021  Jenks et al.
2004/0025949 A1  2/2004  Wygnaski
(Continued)

FOREIGN PATENT DOCUMENTS

CN    102573999 A    7/2012
CN    108025201 A    5/2018
(Continued)

OTHER PUBLICATIONS

Korean Intellectual Property Office as International Searching Authority; International Search Report and Written Opinion; International Application No. PCT/IB2021/052457; mailed Jun. 24, 2021; 12 pages.

*Primary Examiner* — Christopher S Kim
(74) *Attorney, Agent, or Firm* — Foley & Lardner LLP

(57) ABSTRACT

A system includes a manifold and a flow control valve. The flow control valve includes an inlet defining an inlet chamber, an outlet defining an outlet chamber, and a movable member positioned in a control chamber coupled with the inlet and the outlet. The manifold includes a valve actuator, an inlet port that connects with the inlet chamber, an outlet port that connects with the outlet chamber, and a control port that connects the valve actuator with the control chamber to cause the movable member to change from a sealed state that prevents fluid flow between the inlet and the outlet to an unsealed state that allows fluid flow between the inlet and the outlet responsive to operation of the valve actuator.

9 Claims, 17 Drawing Sheets

(51) Int. Cl.
_F16K 31/365_ (2006.01)
_F16K 37/00_ (2006.01)

(58) Field of Classification Search
USPC ........................................................ 169/16
See application file for complete search history.

(56) References Cited

U.S. PATENT DOCUMENTS

| | | |
|---|---|---|
| 2008/0128144 A1 | 6/2008 | Blease |
| 2011/0108290 A1 | 5/2011 | Feenstra |
| 2016/0279454 A1 | 9/2016 | Ringer et al. |

FOREIGN PATENT DOCUMENTS

| | | |
|---|---|---|
| JP | 2011-024793 A | 2/2011 |
| JP | 2011-229693 A | 11/2011 |
| JP | 5350926 B2 | 11/2013 |
| KR | 10-1666070 B1 | 10/2016 |
| TW | 201500621 A | 1/2015 |

SYSTEMS AND METHODS OF FLOW CONTROL VALVES WITH MANIFOLDS

CROSS-REFERENCE TO RELATED APPLICATIONS

The present application claims the benefit of priority to U.S. Provisional Application No. 62/994,439, filed Mar. 25, 2020, and U.S. Provisional Application No. 62/994,440, filed Mar. 25, 2020, the disclosures of which are incorporated herein by reference in their entireties.

BACKGROUND

Sprinkler systems can be used to respond to fires by providing fluids, such as water, to address the fire. For example, sprinkler systems can deliver fluid from a fluid supply to a sprinkler when the sprinkler opens.

SUMMARY

At least one aspect relates to a manifold. The manifold includes a housing, a valve actuator defined by the housing, an inlet channel that extends through the housing to an inlet port on a first side of the housing, the inlet port connects with an inlet chamber of a flow control valve, an outlet channel that extends through the housing to an outlet port that connects with an outlet chamber of the flow control valve, an alarm channel that extends through the housing to an alarm port, the alarm port connects with an alarm chamber of the flow control valve, and a control channel that extends through the housing to a control port that connects with a control chamber of the flow control valve.

At least one aspect relates to a method. The method includes attaching a housing of a manifold to a flow control valve, connecting an inlet port of the manifold with an inlet chamber of the flow control valve, connecting an outlet port of the manifold with an outlet chamber of the flow control valve, connecting an alarm port of the manifold with an alarm chamber of the flow control valve, and connecting a control port of the manifold with a chamber of the flow control valve, the control port connected with a valve actuator of the manifold.

At least one aspect relates to a system. The system includes a manifold and a flow control valve. The flow control valve includes an inlet defining an inlet chamber, an outlet defining an outlet chamber, and a movable member positioned in a control chamber coupled with the inlet and the outlet. The manifold includes a valve actuator, an inlet port that connects with the inlet chamber, an outlet port that connects with the outlet chamber, and a control port that connects the valve actuator with the control chamber to cause the movable member to change from a sealed state that prevents fluid flow between the inlet and the outlet to an unsealed state that allows fluid flow between the inlet and the outlet responsive to operation of the valve actuator.

At least one aspect relates to a method. The method includes connecting an inlet port of a manifold with an inlet chamber of a flow control valve, connecting an outlet port of the manifold with an outlet chamber of the flow control valve, and connecting a control port of the manifold with a control chamber of the flow control valve such that operation of a valve actuator of the manifold coupled with the control port causes a movable member of the flow control valve to change from a sealed state to an unsealed state to cause fluid to flow through the flow control valve from an inlet to an outlet responsive to operation of the valve actuator.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component can be labeled in every drawing. In the drawings.

DETAILED DESCRIPTION

Figure 1:
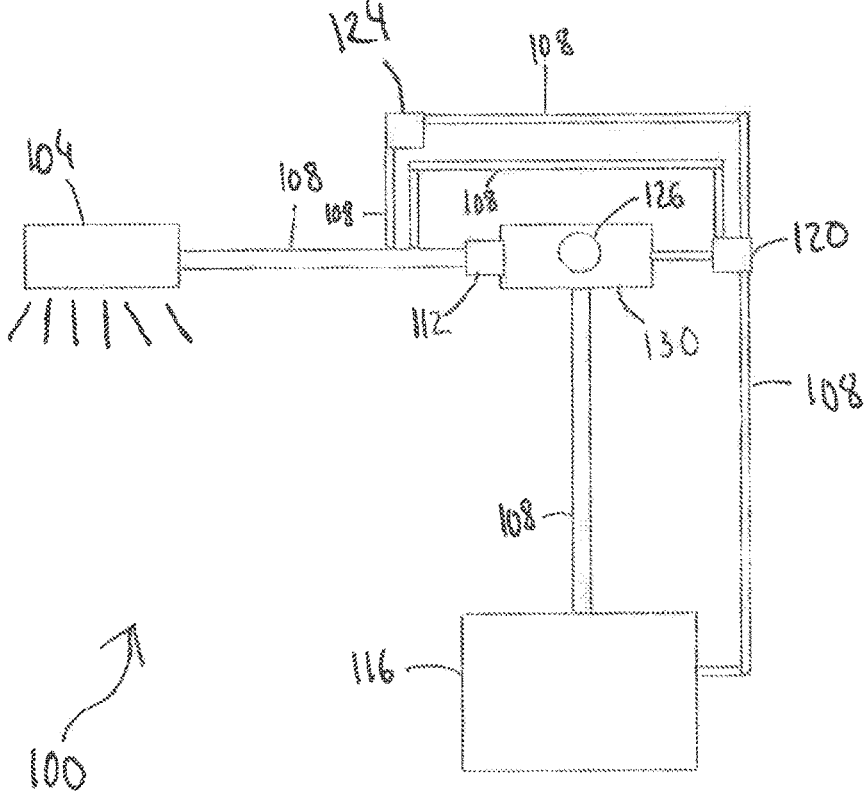
FIG. 1 is a block diagram of a sprinkler system.

Before turning to the figures, which illustrate certain examples, it is noted that the present disclosure is not limited to the details or methodology set forth in the description or illustrated in the figures. The terminology used herein is for the purpose of description only and should not be regarded as limiting.

The present disclosure relates generally to fire sprinkler systems. More particularly, the present disclosure relates to systems and methods of manifolds for flow control valves for sprinkler systems. A sprinkler system can include sprinklers that are activated responsive to temperature in an environment, such as a room or a building, exceeding a predetermined value. Once activated, the sprinklers distribute fire-extinguishing fluid, such as water, in the room or building.

The sprinkler system can be connected with a water supply (e.g., a reservoir or a municipal water supply). The sprinkler system can be provided with a main that enters the building to supply a riser. Connected at the riser can be valves, meters, and an alarm to sound when the system activates. Downstream of the riser, an array of pipes can extend throughout the building.

The sprinkler system can be provided in various configurations and to operate in various modes. In a wet-pipe system, used for example, in buildings having heated spaces for piping branch lines, the system pipes can have a fire-fighting liquid, such as water, for release through an activated sprinkler. In a dry-pipe system, used, for example, in unheated areas, areas exposed to freezing, or areas where water leakage or unintended water discharge is normally undesirable or unacceptable such as, for example, a residential occupancy, the pipes, risers, and feed mains, branch lines and other distribution pipes of the fire protection system can have a gas (air or nitrogen or mixtures thereof) under pressure when the system is in a stand-by or unactuated condition. A valve can separate the pipes that have water from the portions of the system that have gas. When heat from a fire activates a sprinkler, the gas escapes from the branch lines and the dry-pipe valve trips or actuates; water enters branch lines; and firefighting begins as the sprinkler distributes the water.

Sprinkler systems can address a fire condition by outputting fluid from one or more sprinklers in response to the fire condition. For example, the sprinklers can be connected with a fluid supply from which fluid can be received and output-ted to address the fire condition. A flow control valve can be provided between the sprinklers and the fluid supply to control fluid flow to the sprinklers. For example, the flow control valve can selectively control the flow of fluid from the fluid supply to the sprinklers, such as to open a flow path from the fluid supply to the sprinklers responsive to one or more of the sprinklers opening. The flow control valve can include a movable member that moves responsive to pressure changes to cause the valve to open (or close). For example, the flow control valve can be a diaphragm valve that is in a first state, in which a diaphragm prevents flow from an inlet to an outlet of the flow control valve, and can be triggered to a second state, in which the diaphragm moves to allow flow from the inlet to the allow to connect the fluid supply to the sprinklers. The diaphragm can change from the first state to the second state responsive to a change in pressure on the diaphragm, such as a change in pressure resulting from fluid such as water, air, or nitrogen in piping between the flow control valve and an open sprinkler flowing out from the open sprinkler. The flow control valve can include a movable member such as a clapper that moves (e.g., pivots or rotates) responsive to a change in pressure (e.g., air on a first side of the movable member connected with piping to sprinkler can decrease in pressure to a threshold value at which water on a second side of the movable member causes the movable member or a latch or other component coupled with the movable member to move, allowing the water to flow through the flow control valve). The flow control valve can be a differential dry pipe valve. For example, when a sprinkler is exposed to heat from a fire, the sprinkler will open, decreasing pressure in the pipe(s) connected to the sprinkler. This decrease in pressure (e.g., pressure decay, pressure drop) can be used to trigger operation of the flow control valve.

Installing and operating the flow control valve can include connecting various pipes, gauges, actuators, and other trim components with various parts of the flow control valve.

These trim components can be relatively massive, particularly as pipe sizes of the sprinkler system increase. In addition, even if the flow control valve itself can be used in various types of installations (e.g., trims), the trim components can need to be specialized to the particular installation.

Systems and methods in accordance with the present solution can connect a manifold with the flow control valve so that the manifold can reduce the complexity (including size and weight) of trim components used, while enabling flexibility to operate with multiple types of trims. For example, the manifold can include an inlet port that connects with an inlet chamber of the flow control valve, an outlet port that connects with an outlet chamber of the flow control valve, an alarm port that connects with an alarm chamber of the flow control valve, and a control chamber port that connects the valve actuator with a control chamber of the flow control valve to cause the movable member of the flow control valve to change from the sealed state to the unsealed state to cause fluid to flow through the flow control valve from the inlet to the outlet responsive to operation of the valve actuator. The manifold can enable the flow control valve to be used with various trims in various modes of operation, including but not limited to wet pipe, dry pipe, electric, single interlock, and double interlock modes of operation. The manifold can operate with any of a variety of flow control valves that can be selectively caused to allow fluid to flow to sprinklers responsive to a trigger condition for addressing a fire condition.

FIG. 1 depicts a sprinkler system 100. The sprinkler system 100 can include at least one sprinkler 104 coupled with at least one pipe 108. The sprinkler 104 can operate in an open state and a closed state, and can normally operate in the closed state, such as by being biased to the closed state. The sprinkler 104 can switch to the open state in response to a fire condition, such as by being actuated to open when heated by a fire. The at least one pipe 108 can include a network of pipes, such as a network of channels within a manifold 130 or a piping grid. Each sprinkler 104 can receive fluid from the at least one pipe 108.

The sprinkler system 100 can include a flow control valve 112 connected with the at least one pipe 108 and a fluid supply 116. The flow control valve 112 can be between the fluid supply 116 and the sprinkler 104 to control the flow of fluid from the fluid supply 116 to the sprinkler 104. The flow control valve 112 can be in a closed state in which the fluid supply 116 is not in fluid communication with the at least one pipe 108, and an open state in which the fluid supply 116 is in fluid communication with the at least one pipe 108. As described further with reference to FIGS. 6 and 7, the flow control valve 112 can include a movable member such as a diaphragm that moves responsive to pressure applied to the diaphragm to change the flow control valve 112 from the closed state to the open state (e.g., responsive to pressure on the diaphragm decreasing below a threshold pressure). As described further with reference to FIG. 15, the flow control valve 112 can include a movable member such as a clapper that moves responsive to a change in differential pressure across the movable member (e.g., pressure on a dry/air side of the movable member decreasing below a threshold pressure at which pressure on a fluid side of the movable member causes the movable member to move) to change the flow control valve 112 from the closed state to the open state.

The sprinkler system 100 can include a valve actuator 120. The valve actuator 120 can be coupled with a diaphragm chamber of the flow control valve 112, a fluid supply (which can be the fluid supply 116), and the at least one pipe 108. Responsive to a decrease in pressure in the at least one pipe 108, the valve actuator 120 can cause pressure in the diaphragm chamber to decrease, so that the diaphragm of the flow control valve 112 can be tripped to open the flow control valve 112 responsive to the pressure in the diaphragm chamber being less than the threshold pressure. The valve actuator 120 can be the MRA-1 manufactured by Tyco Fire Products. The valve actuator 120 can also provide an external reset feature to close the flow control valve 112, for example after a fire condition. For example, a reset knob can be pushed, or otherwise actuated, allowing a fluid to flow into the diaphragm chamber of the flow control valve 112, thereby increasing the pressure within the diaphragm chamber of the flow control valve 112, which can then close the flow control valve 112 in response to the pressure in the diaphragm chamber being greater than the threshold pressure.

The sprinkler system 100 can include a pilot actuator 124, such as a dry pilot actuator, which can be used for deluge and preaction systems. The pilot actuator 124 can be coupled with the valve actuator 120 and the at least one pipe 108, such as if the sprinkler system 100 is a dry pipe system in which the at least one pipe 108 is filled with air or nitrogen. The pilot actuator 124 can be the DP-1 manufactured by Tyco Fire Products. The pilot actuator 124 can change from a closed state to an open state responsive to a pressure drop in the at least one pipe 108, which can facilitate opening the valve actuator 120 to open the flow control valve 112.

The sprinkler system 100 can include at least one fluid gauge 126, which can be coupled with or installed into the manifold 130. The gauges 126 can present information, such as the fluid pressure of fluid in a fluid channel connected with the fluid gauge 126. The number of fluid gauges 126 installed into the manifold 130 can depend on the type of sprinkler configuration (e.g., deluge wet pipe, dry pilot, etc.). The fluid gauges 126 can include or be coupled with respective pressure transducers that provide pressure information that the gauges 126 present.

Figure 2:
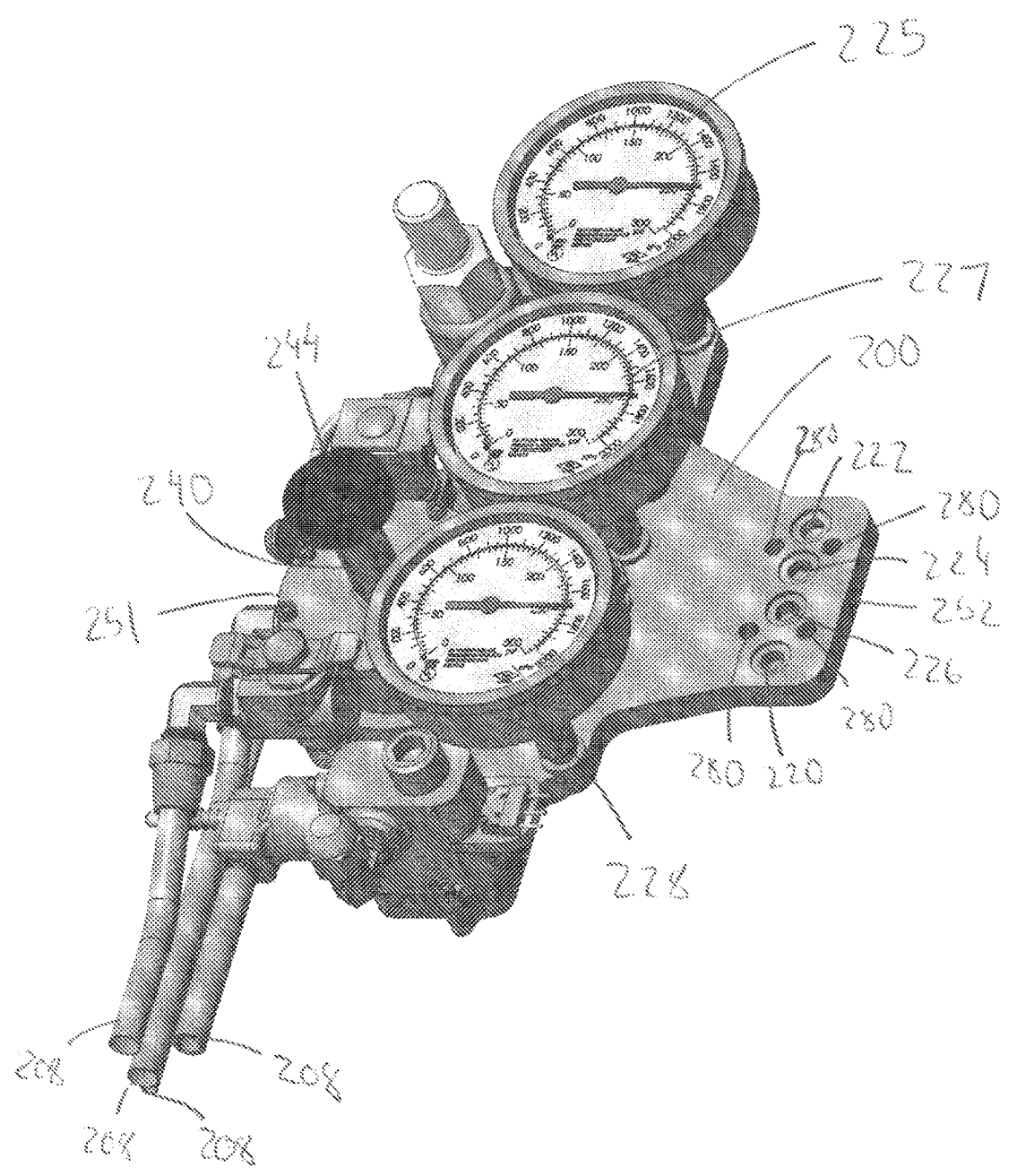
FIG. 2 is a perspective view of a manifold.

FIG. 2 depicts a manifold 230. The manifold 230 can include a manifold housing 200, which can include a plurality of channels used to connect various components of the manifold 230 with one another and with various ports used to connect various components with the manifold housing 200. The manifold housing 200 can be made from a variety of corrosion resistant materials, such as a corrosion resistant metal. For example, manifold housing 200 can be made from 84400 bronze austempered ductile iron (ADI).

The manifold housing 200 includes a plurality of mounting holes 280 that can be used to attach the manifold 230 to a flow control valve (e.g., flow control valve 112 described with reference to FIG. 1; flow control valve 300 described with reference to FIGS. 3-7). The mounting holes 280 can receive mounting members to attach the manifold 230 and the flow control valve. The mounting hole 280 can be threaded so that bolts or screws can be used to attach the manifold 230 to the control valve. When the manifold 230 is attached to the flow control valve, a plurality of ports (e.g., inlet port, outlet port, control port, alarm port) on a second lateral side 252 of the manifold 230 can be in fluid communication with a plurality of ports (e.g., inlet port, outlet port, a control port, alarm port) on the flow control valve. A plurality of pipes (e.g., fluid supply pipe, drain pipe, alarm pipe, test pipe, etc.) can be attached to a first lateral side 251 of the manifold 230. The plurality of pipes on the first lateral side 251 can be in fluid communication with the plurality of ports on the flow control valve via a series of channels that run through the manifold.

The manifold housing 200 includes an inlet port 220 that can fluidly communicate with an inlet port on the flow control valve when the manifold 230 is attached to the flow control valve. The manifold housing 200 includes an outlet port 222 that can fluidly communicate with an outlet port on the flow control valve when the manifold 230 is attached to the flow control valve. The manifold housing 200 includes a control port 224 that can fluidly communicate with a control chamber port on the flow control valve when the manifold 230 is attached to the flow control valve. The manifold housing 200 includes an alarm port 226 that can fluidly communicate with an alarm port on the flow control valve when the manifold 230 is attached to the flow control valve. As depicted, the inlet port 220, the outlet port 222, the control port 224, the alarm port 226, and the plurality of mounting holes 280 can each be located proximate a second lateral side 252 of a first face 250 of the manifold 230.

The manifold 230 can include a first fluid gauge 225 used to display an internal pressure within the manifold 230, such as the air pressure of the air inside a dry pipe in a dry pipe sprinkler system. The first fluid gauge 225 (e.g., gauge 225 of the dry pilot system of FIG. 10) can be installed into a first gauge port in the manifold housing 200. The first gauge port can be in fluid communication with a dry pilot actuator, an air input line, and an outlet port 222. The manifold can include a second fluid gauge 227 used to display an internal pressure within the manifold, such as the fluid pressure within the control port 224, which can correspond with the fluid pressure within a diaphragm chamber of the flow control valve. The second fluid gauge 227 can be installed into a second gauge port in the manifold housing 200, which can be in fluid communication with the control port 224. The manifold 230 can include a third fluid gauge 228 used to display an internal pressure within the manifold, such as the fluid pressure within the inlet port 220, which can correspond to the fluid pressure within an inlet chamber of the flow control valve. The third fluid gauge 228 can be installed into a third gauge port in the manifold housing 200, which can be in fluid communication with the inlet port 220. As depicted, the first fluid gauge 225, the second fluid gauge 227, and the third fluid gauge 228 can each be located proximate the lateral center of the first face 250 of the manifold 230.

The manifold 230 can include a valve actuator 240 in fluid communication with the control port 224. The valve actuator 240 can be used to control the flow control valve. For example, the valve actuator can be used to actuate the flow control valve between a first, unsealed state and a second, sealed state. When the manifold 230 is attached to the flow control valve, the valve actuator 240 can also be in fluid communication with the diaphragm chamber (e.g., control chamber) within the flow control valve. The valve actuator 240 can be in fluid communication with the diaphragm chamber via a first diaphragm channel port and/or a second diaphragm channel port (e.g., control chamber ports). The valve actuator 240 can include a button 244 that can be manually pressed or otherwise actuated. The valve actuator 240 can be coupled to a plunger and a seal, such that when the button 244 is pressed, or otherwise actuated, the plunger and the seal are actuated. The plunger and the seal can be located within the manifold 230 or within the flow control valve. As depicted, the valve actuator 240 is proximate a first lateral side 251, opposite the second lateral side 252, on the first face 250 of the manifold housing 200.

The manifold 230 can further include a plurality of pipes 208, which can be collectively referred to as trim 208. As depicted, the plurality of pipes 208 can be connected to various ports located on the first lateral side 251 of the manifold housing 200. The pipes 208 can have a diameter less than that of inlet 302 and outlet 304 of flow control valve 300. For example, the first lateral side 251 of the housing can have an inlet port that is in fluid communication with the inlet port 220 on the second lateral side 252 via a channel that runs through the manifold housing 200. The first lateral side 251 of the housing can have an outlet port that is in fluid communication with the outlet port 222 on the second lateral side 252 via a channel that runs through the manifold housing 200. The first lateral side 251 of the housing can have an alarm port that is in fluid communication with the alarm port 226 on the second lateral side 252 via a channel that runs through the manifold housing 200. The first lateral side 251 of the housing can have a control chamber port that is in fluid communication with the control port 224 on the second lateral side 252 via a channel that runs through the manifold housing 200. By implementing the manifold 230 to connect components with the flow control valve 300 described herein, the size and weight of the trim 208 can be reduced.

Figure 3:
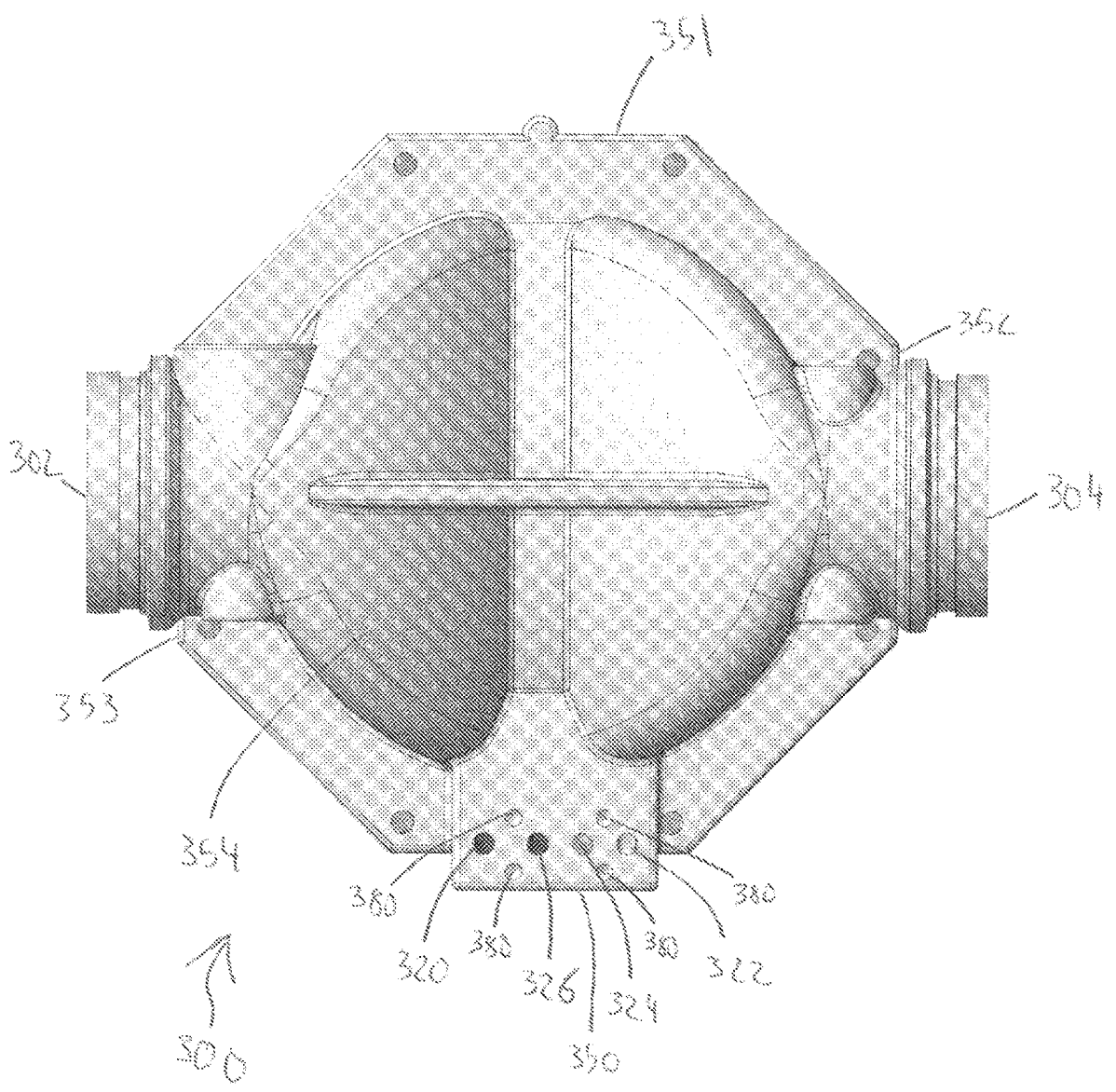
FIG. 3 is a rear view of a flow control valve.

FIG. 3 depicts a flow control valve 300. The flow control valve 300 can include features of the Tyco DV-5A Automatic Water Control Valve. The flow control valve 300 can be controlled between a first, unsealed state and a second, sealed state. When the flow control valve 300 is in the first, unsealed state, the flow control valve 300 can allow fluid to flow from a fluid source to a sprinkler head. When the flow control valve 300 is in the second, sealed state, the flow control valve 300 can prevent fluid from flowing from a fluid source to a sprinkler head.

The flow control valve 300 can include an inlet 302 proximate a bottom portion 353 of the flow control valve 300 and an outlet 304 proximate a top portion 352, opposite the bottom portion 353 of the flow control valve 300. The flow control valve 300 can include a diaphragm that is movable between at least a first position and a second position. Further, the flow control valve 300 can be actuated between at least a first, unsealed state and a second, sealed state. When the flow control valve 300 is in the first, unsealed state, the diaphragm can be in the first position, allowing the inlet 302 to be in fluid communication with the outlet 304. When the flow control valve 300 is in the second, sealed state, the diaphragm can be in the second position, such that the diaphragm prevents the inlet 302 from being in fluid communication with the outlet 304.

The flow control valve 300 can have a plurality of mounting holes 380 used to attach the flow control valve 300 to the manifold 230. The mounting holes 380 can align with a plurality of mounting holes of the manifold 230. The mounting holes 380 can be threaded so that bolts or screws can be used to attach the flow control valve 300 to the manifold 230.

The flow control valve 300 can have an inlet port 320 that can be in fluid communication with an inlet port on the manifold when the flow control valve 300 is mounted to the manifold. The flow control valve 300 can have an outlet port 322 that can be in fluid communication with an outlet port on the manifold when the flow control valve 300 is mounted to the manifold. The flow control valve 300 can have a control chamber port 324 that can be in fluid communication with a control port on the manifold when the flow control valve 300 is mounted to the manifold. The flow control valve 300 can have an alarm port 326 that can be in fluid communication with an alarm port on the manifold when the flow control valve 300 is mounted to the manifold. As depicted, the inlet port 320, the outlet port 322, the control chamber port 324, and the alarm port 326 are all located on a second face 354 of the flow control valve 300 proximate a first lateral side 350, opposite a second lateral side 351, which can enable coupling with the manifold 230.

Figure 4:
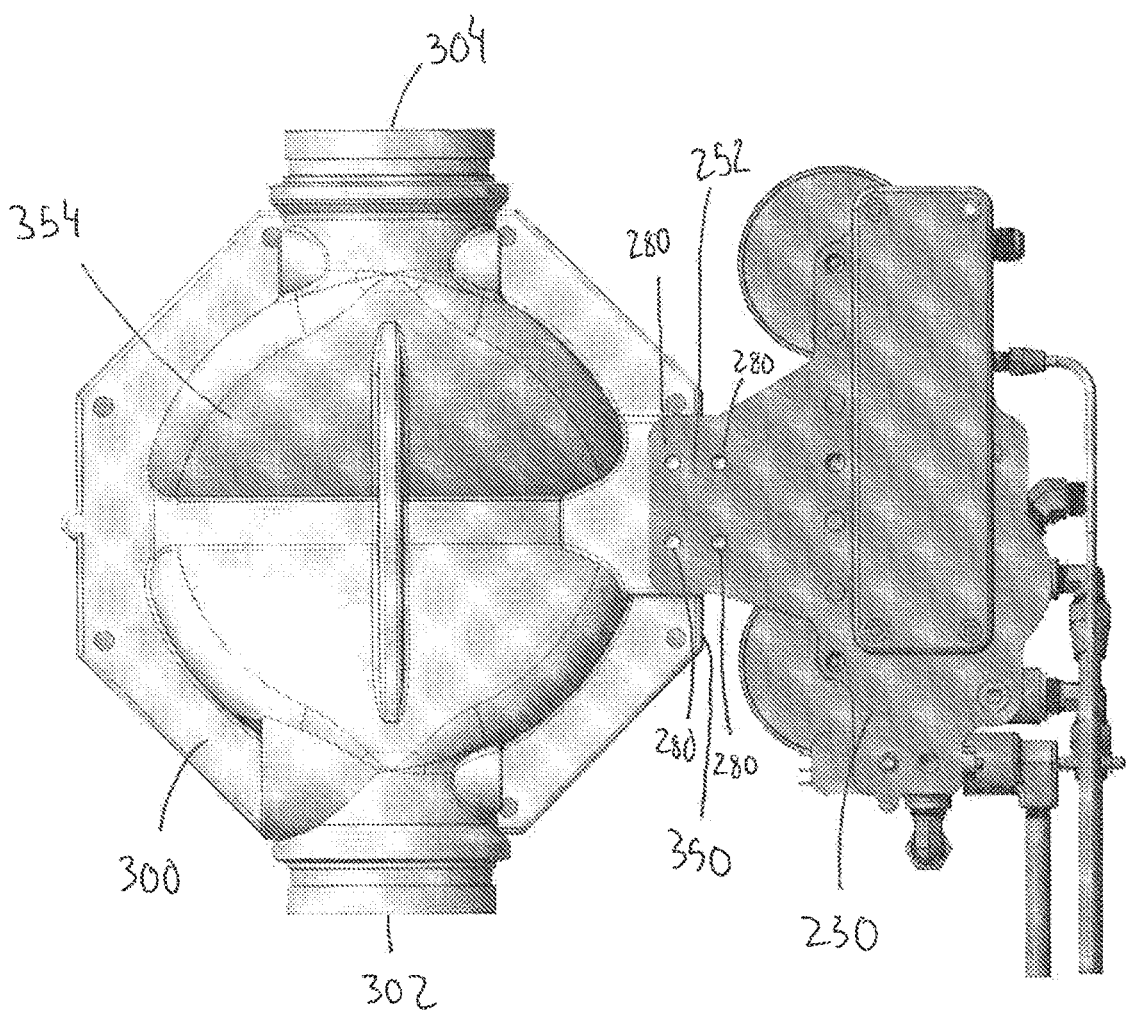
FIG. 4 is a rear view of a flow control valve mounted to a manifold.

FIG. 4 depicts the flow control valve 300 mounted to a manifold 230. The manifold 230 can be mounted to the flow control valve using a plurality of mounting holes 280 on the manifold 230 that correspond with a plurality of mounting holds on the flow control valve 300. A first face of the manifold 230 can be mounted to the second face 354 of the flow control valve 300. When mounted, an inlet port located proximate a second lateral side 252 of the manifold 230 can be in fluid communication with an inlet port located proximate a first lateral side 350 of the flow control valve 300, which can also by in fluid communication with the inlet 302. Further, when mounted, an outlet port on the manifold 230 can be in fluid communication with an outlet port on the flow control valve 300, which can also be in fluid communication with the outlet 304.

Figure 5:
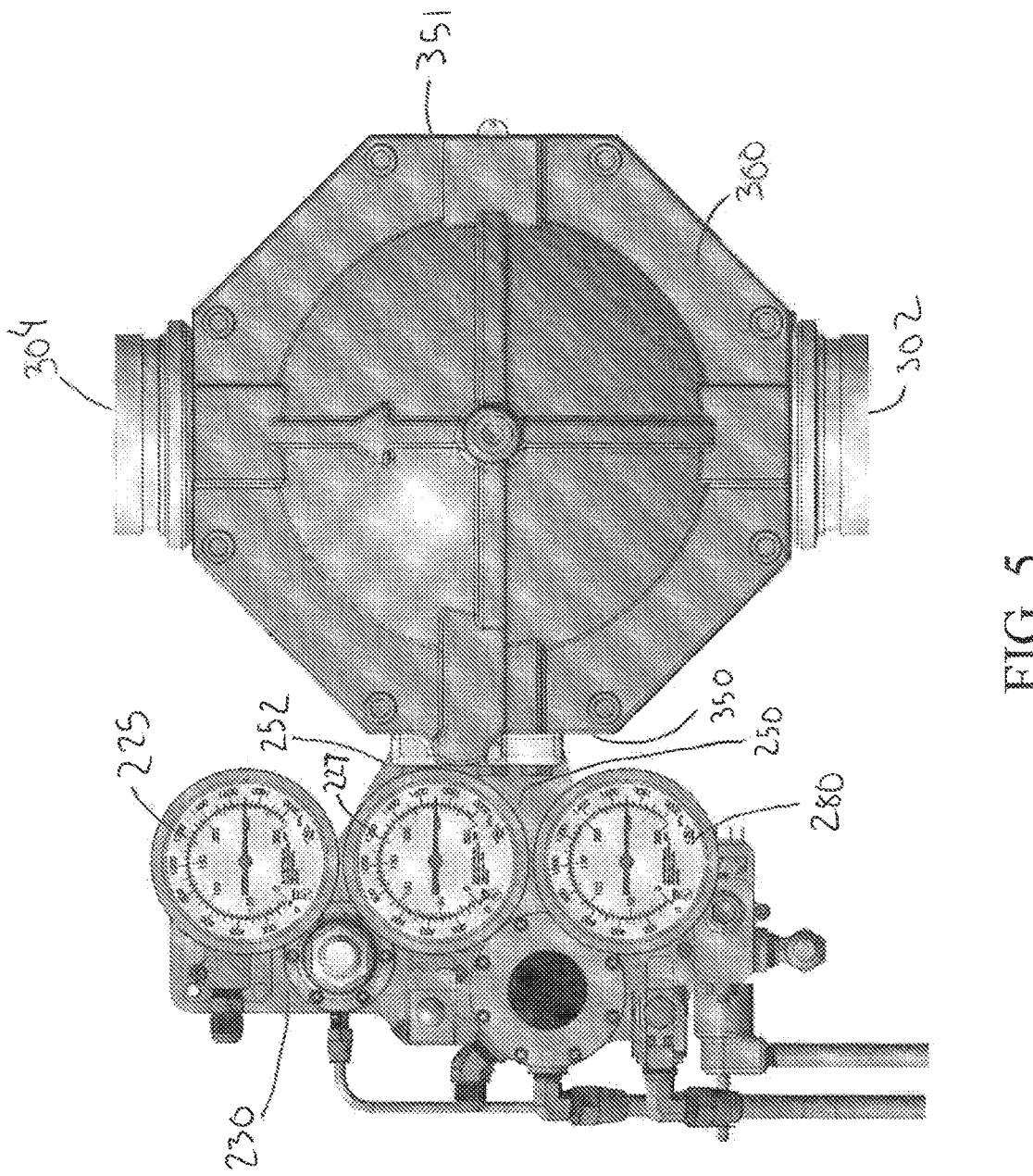
FIG. 5 is a front view of a flow control valve mounted to a manifold.

FIG. 5 depicts the manifold 230 attached to the flow control valve 300. A second face of the flow control valve 300 is attached to a first face 250 of the manifold 230. Further, a plurality of mounting holes proximate a first lateral side 350 of the flow control valve 300 are attached to a plurality of mounting holes proximate a second lateral side 252 of the manifold 230. The flow control valve 300 is controllable between at least a first, unsealed state and a second, sealed state. In the first, unsealed state, an inlet 302 is in fluid communication with the outlet 304. In the second, sealed state, the inlet 302 is not in fluid connection with the outlet 304.

The flow control valve 300 can be in fluid connection with the manifold 230. The flow control valve 300 can have an inlet port that can be in fluid communication with the inlet 302 and an inlet port on the manifold 230 when the flow control valve 300 is mounted to the manifold 230. The flow control valve 300 can have an outlet port that can be in fluid communication with the outlet 304 and an outlet port on the manifold 230 when the manifold 230 is mounted to the flow control valve 300. The flow control valve 300 can have a control chamber port that can be in fluid communication with a diaphragm chamber inside the flow control valve 300 and a control port on the manifold 230 when the flow control valve 300 is mounted to the manifold 230. The flow control valve 300 can have an alarm port that can be in fluid communication with an alarm port on the manifold 230 when the flow control valve 300 is mounted to the manifold 230.

The manifold 230 can include a first fluid gauge 225 used to display an internal pressure within the manifold 230, such as the air pressure of the air inside the outlet port, which can correspond with the air pressure inside a pipe used in a dry pipe sprinkler system. The manifold 230 can include a second fluid gauge 227 used to display an internal pressure within the manifold, such as the fluid pressure within the control chamber port, which can correspond with the fluid pressure within the control chamber of the flow control valve. The manifold 230 can include a third fluid gauge 228 used to display an internal pressure within the manifold, such as the fluid pressure within the inlet port, which can correspond to the fluid pressure at the inlet 302 of the flow control valve 300.

Figure 6:
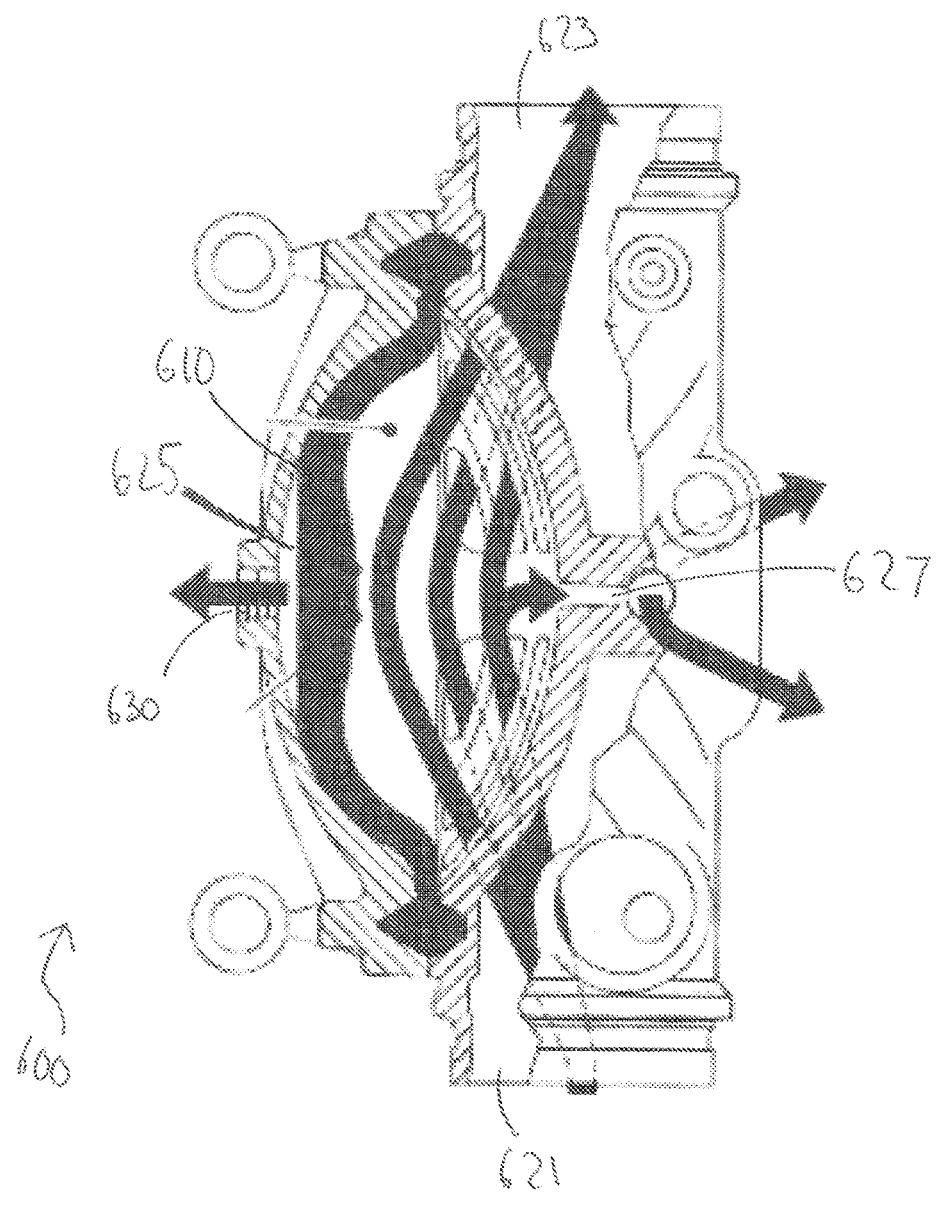
FIG. 6 is a cross sectional view of a flow control valve.

FIG. 6 depicts a cross section view of a flow control valve 600, features of which can incorporated into the flow control valve 300. The flow control valve 600 can be a diaphragm valve, such as the DV-5A Automatic Water Control Valve manufactured by Tyco Fire Products. The flow control valve 600 can include an inlet chamber 621, an outlet chamber 623, a diaphragm chamber 625 (e.g., control chamber), a diaphragm 610 positioned within the diaphragm chamber 625, and an alarm chamber 627. The diaphragm 610 can be controllably movable within the diaphragm chamber 625 between a first position and a second position. As depicted, the flow control valve 600 is in a first, unsealed state. When the flow control valve 600 is in the first, unsealed state, the diaphragm 610 can be in the first position, allowing the inlet chamber 621 to be in fluid communication with the outlet chamber 623. When the flow control valve 600 is in the first, unsealed state, the fluid pressure within the inlet chamber 621 and the outlet chamber 623 can be greater than the fluid pressure within the diaphragm chamber 625. This pressure difference can force the diaphragm 610 away from the inlet chamber 621 and the outlet chamber 623, and towards a control chamber port 630.

Figure 7:
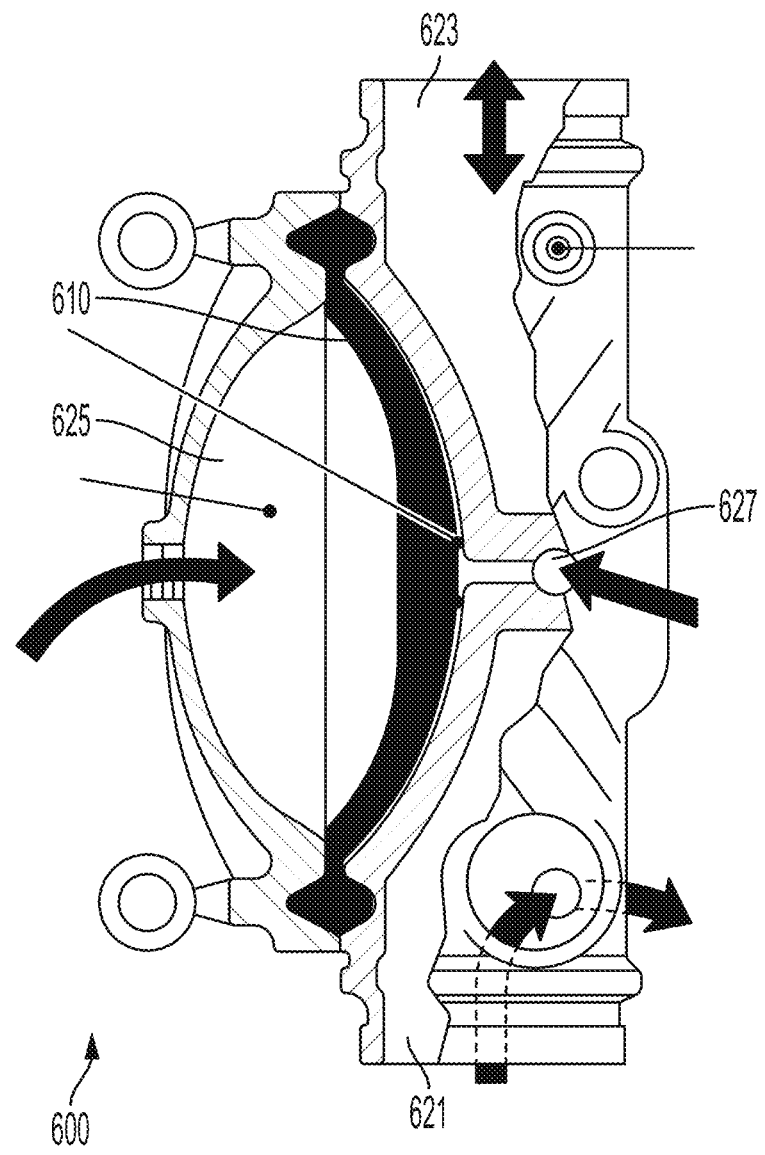
FIG. 7 is a cross sectional view of a flow control valve.

FIG. 7 depicts a cross section view of the flow control valve 600. As depicted, the flow control valve 600 is in a second, sealed state. When the flow control valve 600 is in the second, sealed state, the diaphragm 610 can be in the second position, preventing the inlet chamber 621 from being in fluid communication with the outlet chamber 623.

The diaphragm 610 can be actuated from the second position to the first position using a valve actuator (e.g., valve actuator 240). The valve actuator can be in fluid communication with the diaphragm chamber 625, for example, via a control chamber port 630. When the flow control valve 600 is a first, unsealed state, the valve actuator can be in an open position. When the valve actuator is in the open position, a plunger and a seal are not in contact with a seat located within the valve actuator. When the button is pressed, or otherwise actuated, the plunger and seal will be pressed down against the seat, directing fluid into the diaphragm chamber 625. When the plunger and seal are pressed against the seat, the valve actuator is in a closed position. When the valve actuator is in the closed position, fluid will be directed into the diaphragm chamber causing pressure to build within the diaphragm chamber 625. The pressure within the diaphragm chamber 625 will cause the diaphragm 610 to move to the second position, wherein the flow control valve 600 is in the second, sealed state.

A valve actuator can actuate the diaphragm 610 from the first position to the second position. The valve actuator can be a reset actuator, such as a manual reset actuator. The valve actuator can be located on or within the manifold. The valve actuator can be in fluid communication with a control chamber port of the manifold, such that the valve actuator can cause a pressure drop in control chamber port in the manifold, causing a pressure drop in the control chamber port 630 of the flow control valve, causing a pressure drop in the diaphragm chamber 625 of the flow control valve. This pressure drop within the diaphragm chamber 625 can actuate the diaphragm 610 to the first position, causing the flow control valve 600 to transition from the second, sealed state to the first, unsealed stated, thereby putting the inlet chamber 621 in fluid communication with the outlet chamber 623. The valve actuator can be in direct fluid communication with the diaphragm chamber 625. The valve actuator can actuate the diaphragm 610 in response, for example, to a temperature being detected that is over a temperature threshold.

Figure 8:
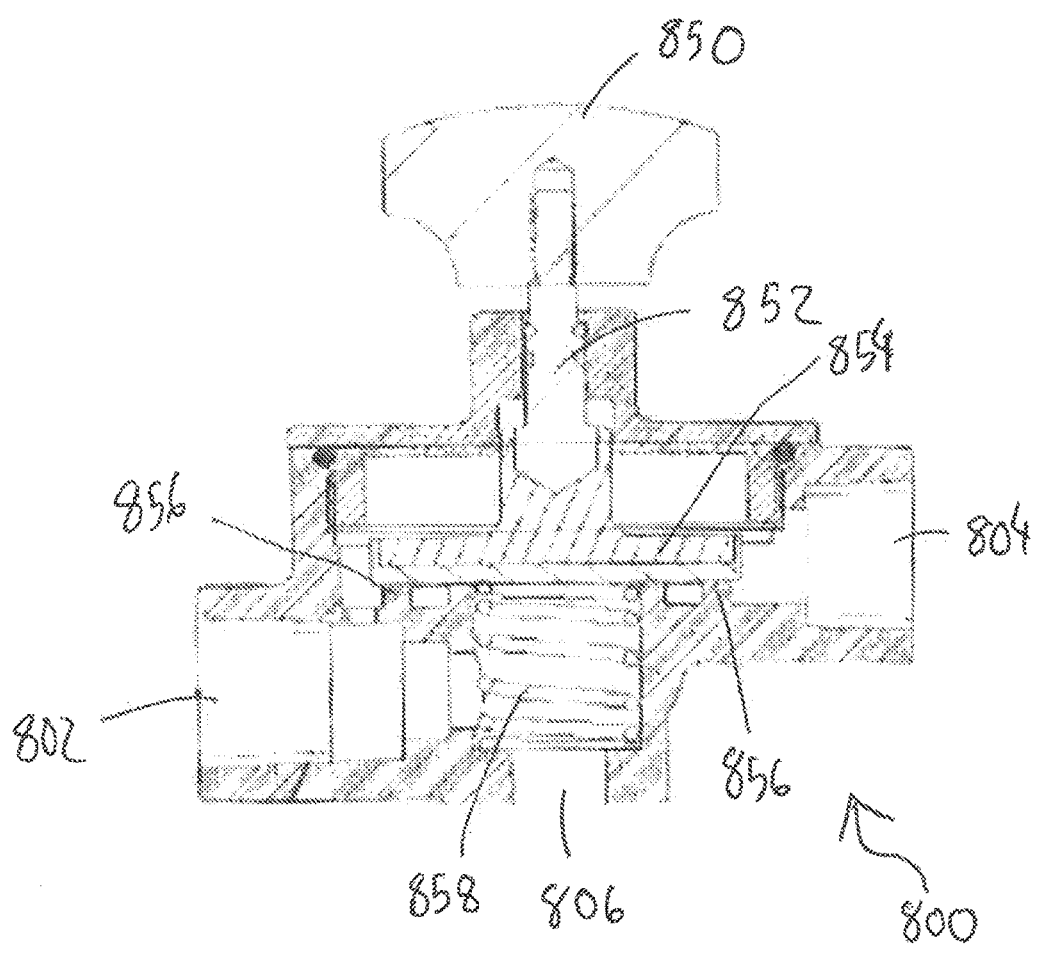
FIG. 8 is a cross sectional view of a valve actuator.

FIG. 8 depicts a valve actuator 800. The valve actuator 800 can be the MRA-1 Actuator manufactured by Tyco Fire Products. Features of the valve actuator 800 can be incorporated in the valve actuator 240. The valve actuator 800 can include a button 850 that is mechanically coupled to a plunger 852. The plunger 852 can be mechanically coupled to a seal 854. The valve actuator can have an inlet 802, which can be in fluid communication with an inlet of a flow control valve, and an outlet 804, which can be in fluid communication with an outlet port of a manifold. The valve actuator 800 can also include a diaphragm outlet 806 that is in fluid communication with a diaphragm chamber of a flow control valve, for example via a diaphragm channel port.

The valve actuator 800 can be movable between a first, open position and a second, closed position. When the flow control valve is the first, unsealed state, the valve actuator 800 can be in an open position. When the valve actuator 800 is in the open position, the plunger 852 and the seal 854 are not in contact with a seat 856 located within the valve actuator 800. Further, a spring 858 can be used to bias the plunger 852 and seal 854 away from the seat 856. When the button 850 is pressed, or otherwise actuated, the plunger 852 and seal 854 are pressed down against the seat 856. When the plunger 852 and seal 854 are pressed against the seat 856, the valve actuator 800 is in a closed position, such as the position shown in FIG. 8. When the valve actuator 800 is in the closed position, fluid will be directed from the inlet 802, through the diaphragm outlet 806 and into the diaphragm chamber (e.g., control chamber) of the flow control valve. The fluid directed into the diaphragm chamber of the flow control valve will cause pressure to build within the diaphragm chamber. The pressure within the diaphragm chamber will cause a diaphragm to move to a second, closed position, wherein the flow control valve is in a second, sealed state. When the flow control valve is in the second, sealed state, the diaphragm will prevent an inlet in the flow control valve from being in fluid communication with an outlet in the fluid control valve. Further, when the valve actuator 800 is in closed position, sufficient pressure will build up within the valve actuator 800, creating a downward force on the plunger 852 and seal 854 that is sufficient to overcome the upward force of the spring 358.

The valve actuator 800 can be installed into a first face of the manifold, which is mounted to the flow control valve, such that the valve actuator 800 is in fluid communication with both the manifold and the flow control valve. The valve actuator 800 can be in fluid communication with the diaphragm chamber via a first diaphragm channel port or a second diaphragm channel port. Further, the first diaphragm channel port can be in fluid communication with the second diaphragm channel port via the diaphragm chamber.

The button 850 can be coupled to the first face of the manifold 130, while the plunger 852 and seal 854 are coupled to the flow control valve. In this example, the button 850 is mechanically coupled to the plunger 852 and seal 854, such that pressing, or otherwise actuating the button 850 will cause the plunger 852 and the seal 854 to press against the seat 856, thereby causing the flow control valve to actuate from the first, unsealed state to the second, sealed state.

Referring briefly to FIGS. 9-14, various systems (e.g., trims) are depicted that can use the manifold 230 to implement a more compact and easy to install sprinkler system. For example, a same example of the manifold 230 can be implemented in wet pipe, dry pipe, and electric systems, among others described herein, while providing integrated and compact connections with pressure gauges, actuators, control elements, and alarms, reducing the number, size, and weight of trim components and piping for implementing various such systems. FIGS. 9-14 describe use of the manifold 230 with the flow control valve 300; the manifold 230 can also be used with the flow control valve 1500 described with reference to FIG. 15 as described below.

Figure 9:
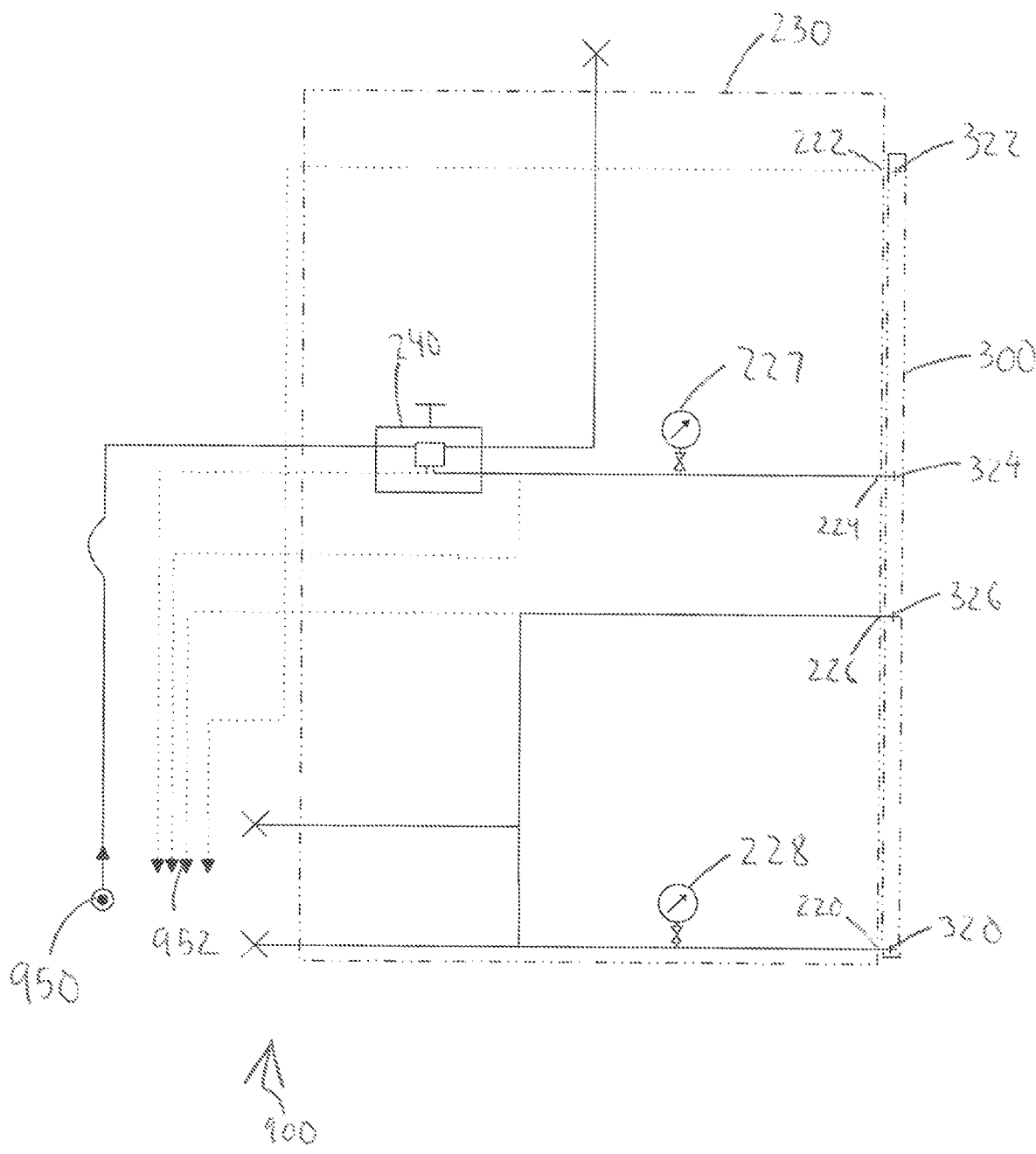
FIG. 9 is a schematic diagram of a wet pipe sprinkler system.
Figure 10:
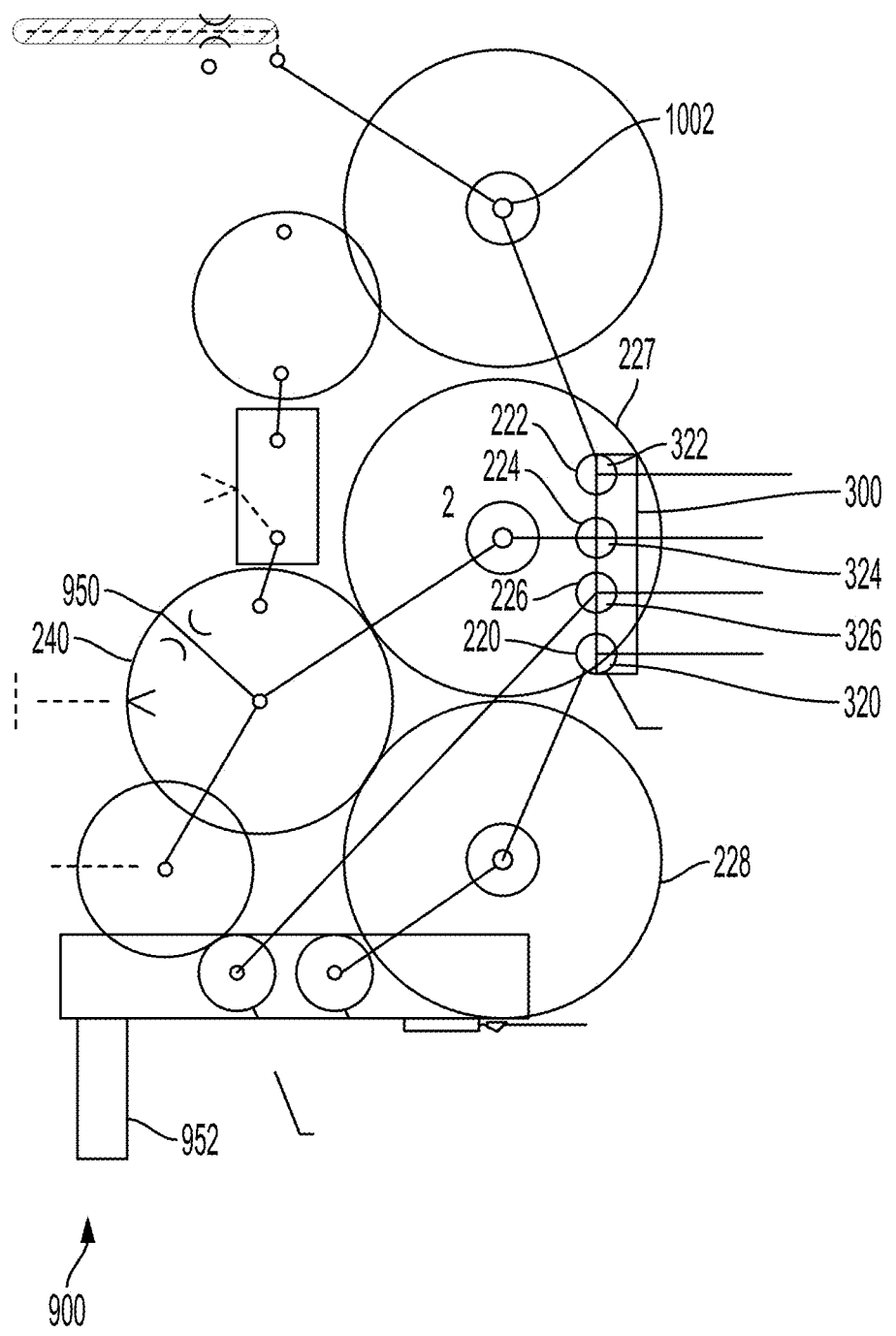
FIG. 10 is a schematic diagram of a wet pipe sprinkler system.

FIGS. 9 and 10 depict features of a sprinkler system 900, which can be implemented as a wet pipe sprinkler system. The wet pipe sprinkler system 900 includes the manifold 230, which can share similar characteristics of other manifolds disclosed herein. The manifold 230 can be connected to the flow control valve 300. For example, the manifold 230 can have an inlet port 220 that can be in fluid communication with an inlet port 320 on the flow control valve 300 when the manifold 230 is connected to the flow control valve 300. The manifold 230 can have an alarm port 226 that can be in fluid communication with an alarm port 326 on the flow control valve 300 when the manifold 230 is connected to the flow control valve 300. The manifold 230 can have a control port 224 that can be in fluid communication with a control chamber port 324 on the flow control valve 300 when the manifold 230 is connected to the flow control valve 300. The manifold 230 can have an outlet port 222 that is in fluid communication with an outlet port 322 on the flow control valve 300 when the manifold 230 is connected to the flow control valve 300. Further, the inlet port 220 can be in fluid communication with a water supply 950 and the outlet port 222 can be in fluid communication with a drain 952.

The manifold 230 can also include a valve actuator 240. For example, the valve actuator 240 can incorporate features of the MRA-1 manufactured by Tyco Fire Products. The valve actuator 240 can be in fluid communication with the water supply 950. Further, valve actuator 240 can be in fluid communication with the control port 224. The valve actuator 240 can be movable between a first, open position and a second, closed position. When the flow control valve 300 is in a first, unsealed state, the valve actuator 240 can be in an open position. The valve actuator 240 can then be pressed, or otherwise actuated into the second, closed position. When the valve actuator 240 is in the second, closed position, the valve actuator 240 will direct fluid from the water supply 950, through the control port 224, and into a diaphragm chamber in the flow control valve 300. The fluid directed into the diaphragm chamber of the flow control valve 300 will cause pressure to build within the diaphragm chamber. The pressure within the diaphragm chamber will cause a diaphragm to move to a second, closed position, wherein the flow control valve 300 is in a second, sealed state. When the flow control valve 300 is in the second, sealed state, the diaphragm will prevent an inlet in the flow control valve 300 from being in fluid communication with an outlet in the fluid control valve.

The manifold 230 can also include a fluid gauge 227 in fluid communication with the valve actuator 240 and the control port 224, which can correspond to the fluid pressure within the diaphragm chamber of the flow control valve 300. The fluid gauge 227 can be utilized by a person using the valve actuator 240. For example, a person that presses the valve actuator 240 can need to hold a button on the valve actuator 240 down until a certain threshold pressure is achieved within the valve actuator 240, which can be displayed on the fluid gauge 227.

The manifold 230 can also include another fluid gauge 228 in fluid communication with the inlet port 220. The fluid gauge 228 can display the pressure inside the manifold at the inlet port, which can correspond to the fluid pressure at the inlet of the flow control valve 300. The fluid gauge 228 can be used to determine whether the flow control valve 300 is in a first, unsealed state, or a second, sealed state. For example, the pressure displayed by the fluid gauge 228 can be higher when the flow control valve 300 is in the second, sealed state than when the flow control valve 300 is in the first, unsealed state.

The manifold 230 can have additional ports, such as port 1002 and internal channels that are not utilized in the wet pipe configuration. The unused ports and internal channel can be plugged as to prevent fluid from escaping from the unused ports.

Figure 11:
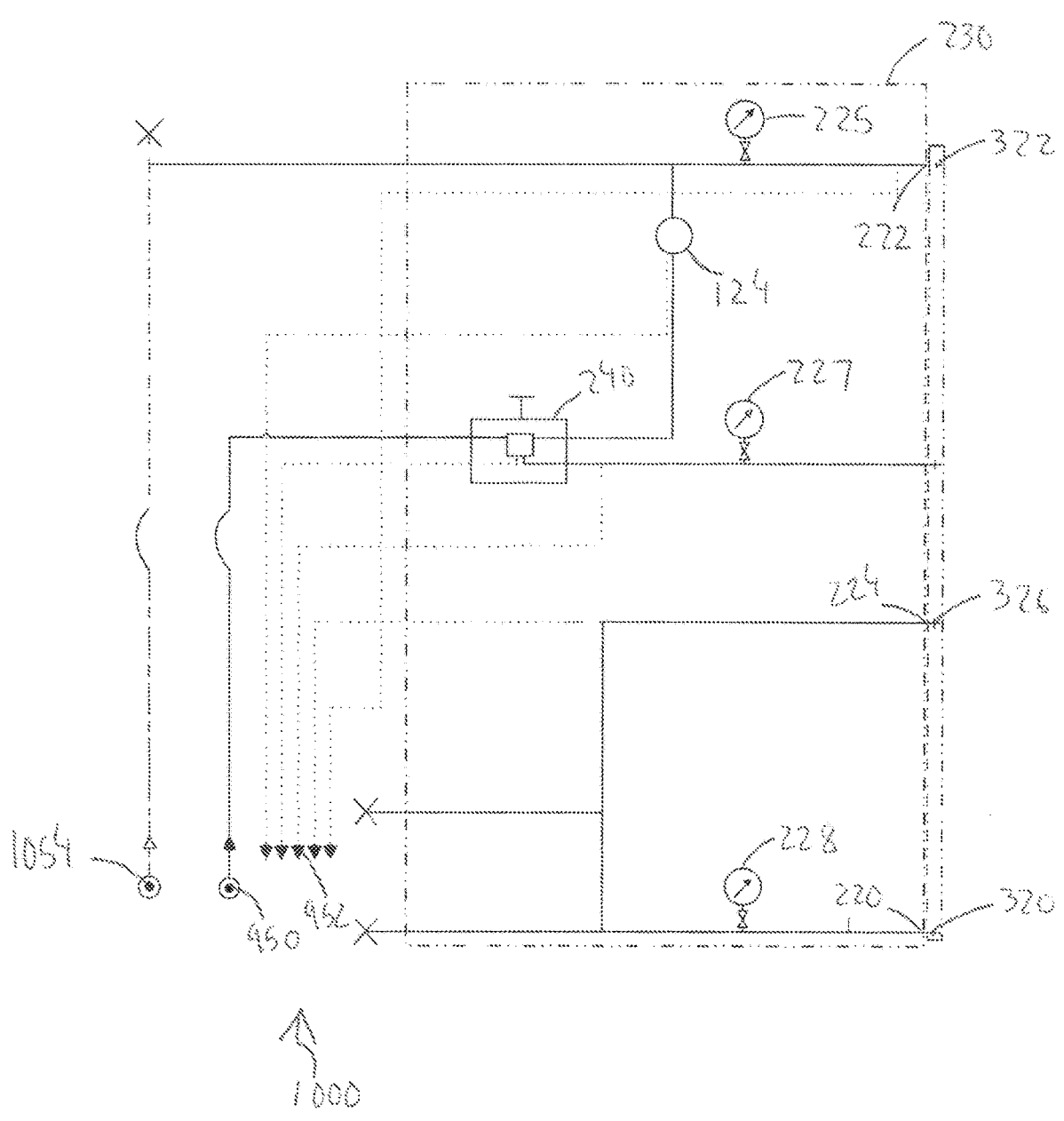
FIG. 11 is a schematic diagram of a dry pipe sprinkler system.
Figure 12:
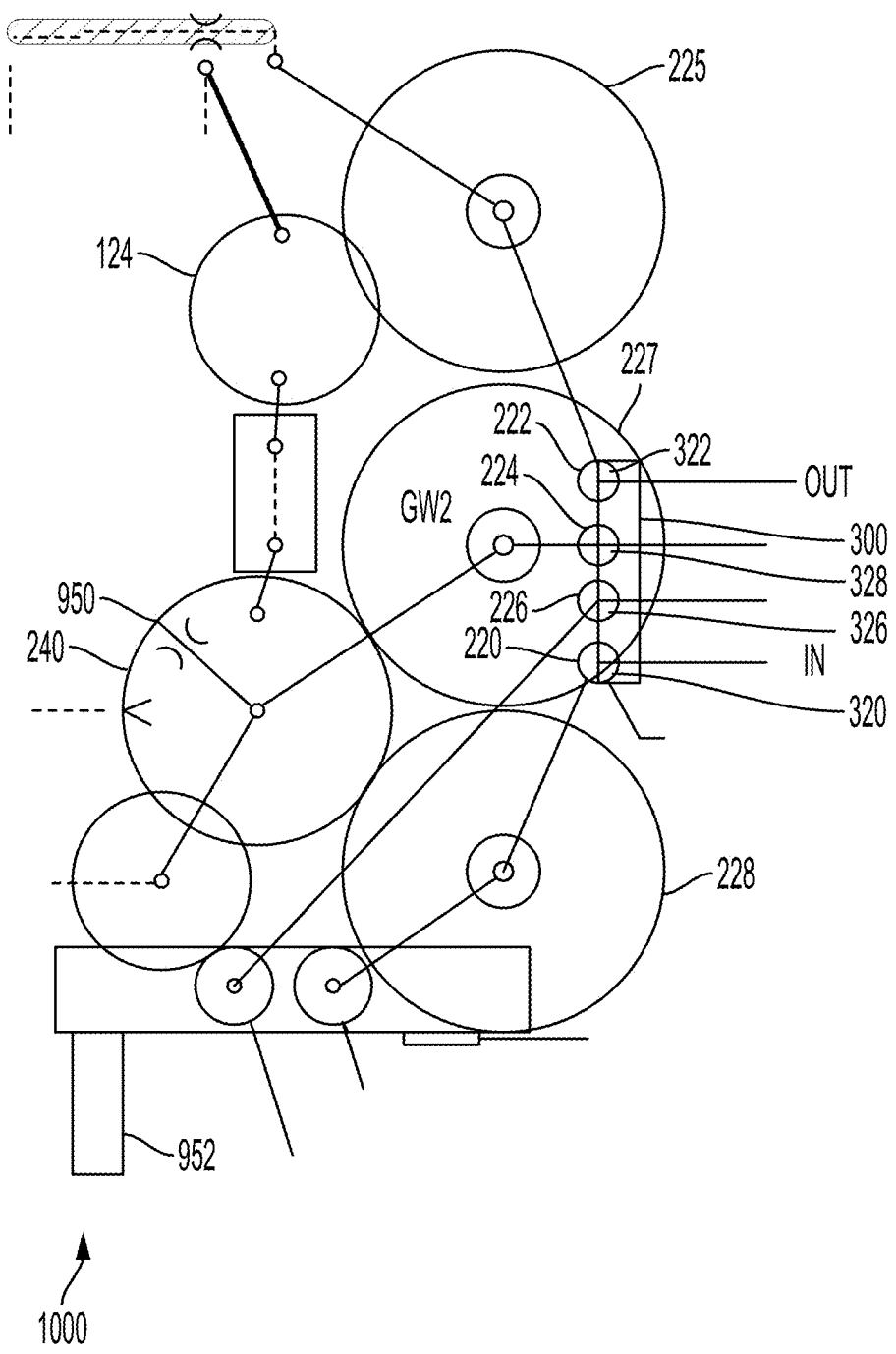
FIG. 12 is a schematic diagram of a dry pipe sprinkler system.

FIGS. 11 and 12 depict features of a sprinkler system 1000, which can be implemented as a dry pipe sprinkler system. The dry pipe sprinkler system 1000 includes the manifold 230 and the flow control valve 300. For example, the manifold 230 can have an inlet port 220 that can be in fluid communication with an inlet port 320 on the flow control valve 300 when the manifold 230 is connected to the flow control valve 300. The manifold 230 can have an alarm port 226 that can be in fluid communication with an alarm port 326 on the flow control valve 300 when the manifold 230 is connected to the flow control valve 300. The manifold 230 can have a control port 224 that can be in fluid communication with a control chamber port 324 on the flow control valve 300 when the manifold 230 is connected to the flow control valve 300. The manifold 230 can have an outlet port 222 that is in fluid communication with an outlet port 322 on the flow control valve 300 when the manifold 230 is connected to the flow control valve 300. Further, the inlet port 220 can be in fluid communication with a water supply 950 and the outlet port 222 can be in fluid communication with a drain 952.

The manifold 230 can also include a valve actuator 240. For example, the valve actuator 240 can be the MRA-1 manufactured by Tyco Fire Products. The valve actuator 240 can be in fluid communication with the water supply 950. Further, valve actuator 240 can be in fluid communication with the control port 224. The valve actuator 240 can be movable between a first, open position and a second, closed position. When the flow control valve 300 is in a first, unsealed state, the valve actuator 240 can be in an open position. The valve actuator 240 can then be pressed, or otherwise actuated into the second, closed position. When the valve actuator 240 is in the second, closed position, the valve actuator 240 will direct fluid from the water supply 950, through the control port 224, and into a diaphragm chamber in the flow control valve 300. The fluid directed into the diaphragm chamber of the flow control valve 300 will cause pressure to build within the diaphragm chamber. The pressure within the diaphragm chamber will cause a diaphragm to move to a second, closed position, wherein the flow control valve 300 is in a second, sealed state. When the flow control valve 300 is in the second, sealed state, the diaphragm will prevent an inlet in the flow control valve 300 from being in fluid communication with an outlet in the fluid control valve.

The manifold 230 can also include a dry pilot actuator 124. The dry pilot actuator can be the DP-1 Dry Pilot Actuator manufactured by Tyco. The dry pilot actuator 124 can be in fluid communication with an air input 1054 and the outlet port 222. The dry pilot actuator 124 can also be in fluid communication with the valve actuator 240, which is in fluid communication with the diaphragm chamber of the flow control valve 300. The dry pilot actuator 124 can be used to release water from the valve actuator 240, thereby tripping the valve actuator 240, thereby venting water from the diaphragm chamber of the flow control valve 300. The dry pilot actuator 124 can be used to detect a gas release from the sprinkler piping network, thereby tripping the valve actuator 240. When the valve actuator 240 is tripped, a pressure drop is created in the diaphragm chamber of the flow control valve 300, allowing the diaphragm to move from a second, closed position to a first, open position.

The manifold 230 can also include a first fluid gauge 225 in fluid communication with the valve actuator 240 and the control port 224, which can correspond to the fluid pressure within the diaphragm chamber of the flow control valve 300. The fluid gauge 225 can be utilized by a person using the valve actuator 240. For example, a person that presses the valve actuator 240 can need to hold a button on the valve actuator 240 down until a certain threshold pressure is achieved within the valve actuator 240, which can be displayed on the fluid gauge 225.

The manifold 230 can also include a second fluid gauge 227 in fluid communication with the inlet port 220. The fluid gauge 227 can display the pressure inside the manifold at the inlet port, which can correspond to the fluid pressure at the inlet of the flow control valve 300. The fluid gauge 227 can be used to determine whether the flow control valve 300 is in a first, unsealed sate of a second, sealed state. For example, the pressure displayed by the fluid gauge 227 can be higher when the flow control valve 300 is in the second, sealed state than when the flow control valve 300 is in the first, unsealed state.

A pressure valve, a pressure transducer, and/or a pressure sensor can be in fluid communication with the alarm port 326. The pressure valve or pressure transducer can be indicative of the position that the flow control valve 300 is in. For example, when the flow control valve 300 is in the second, sealed state, the pressure at the alarm port 326 can be at or near atmospheric pressure, and when the flow control valve 300 is in the first, unsealed state (i.e., after the valve actuator 240 has been tripped), the pressure at the alarm port 326 can be higher than atmospheric pressure. The pressure transducer and/or pressure sensor in fluid communication with the alarm port 326 can further be in wireless communication (e.g., WiFi, radio, RFID, Bluetooth, infra-red, etc.) with an alarm, which can indicate if the flow control valve 300 is in first, unsealed position or the second, sealed position. The pressure transducer and/or pressure sensor can be connected to an alarm via wires.

The manifold 230 can also include a third fluid gauge 228 in fluid communication with the air input 1054 and the dry pilot actuator 124. The third fluid gauge 228 can be used to display the air pressure inside the pipes that are filled with air when the flow control valve 300 is in the second, sealed state.

The manifold 230 can have additional ports and internal piping that are not utilized in the wet pipe configuration. The unused ports and internal piping can be plugged as to prevent fluid from leaking from the unused ports.

Figure 13:
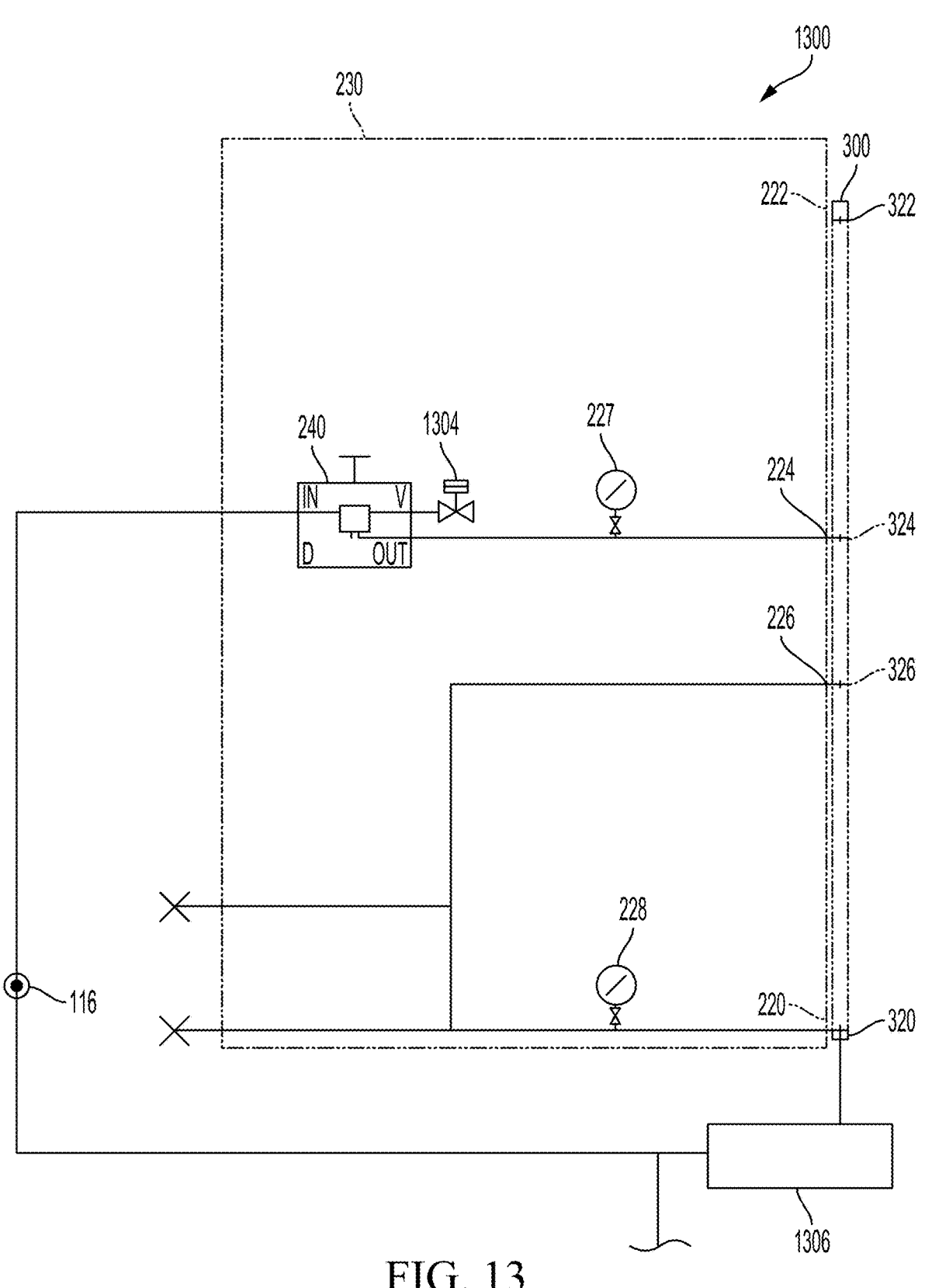
FIG. 13 is a schematic diagram of an electrically controlled sprinkler system.
Figure 14:
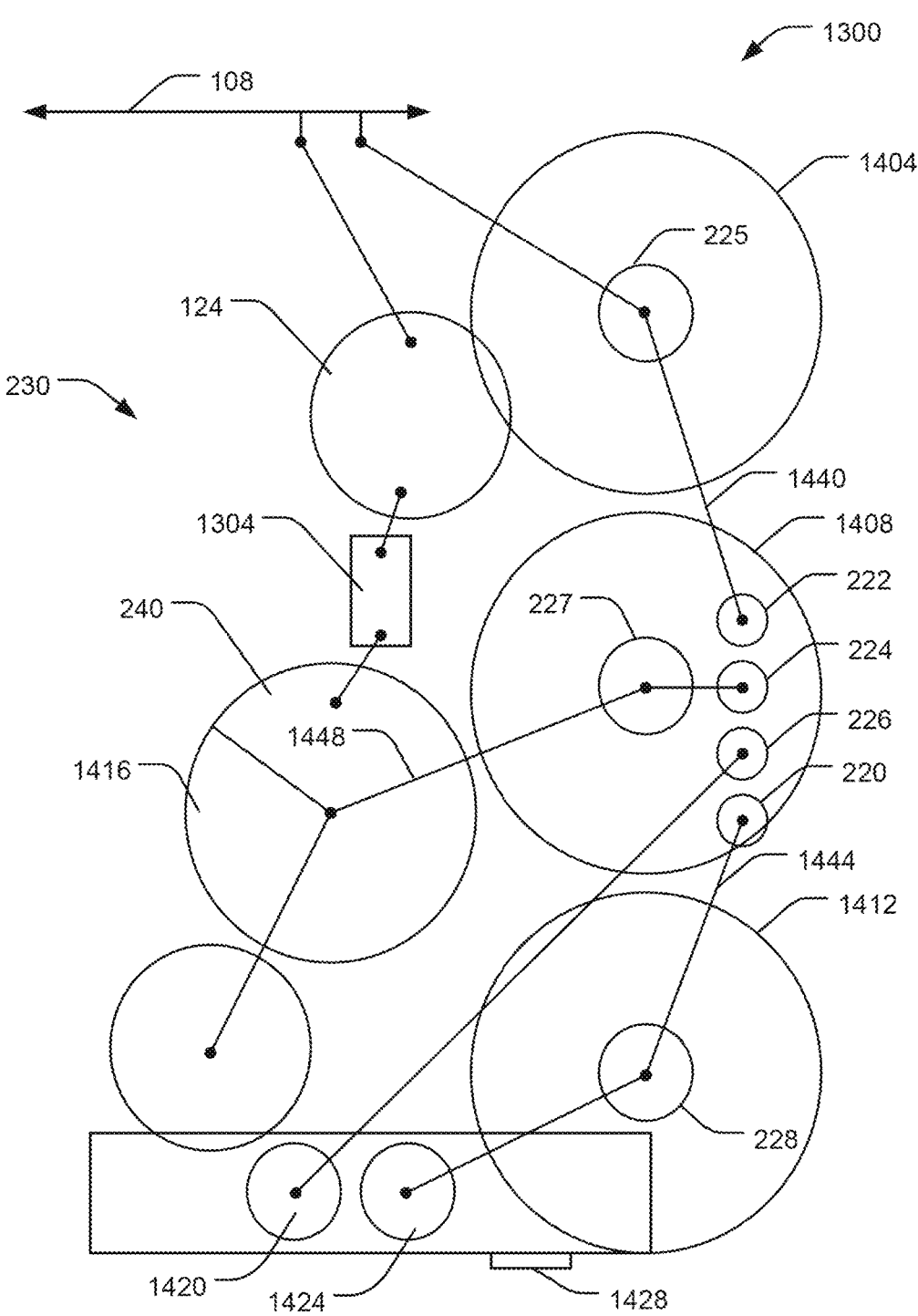
FIG. 14 is a schematic diagram of an electrically controlled sprinkler system.

FIGS. 13 and 14 depict features of a sprinkler system 1300 that includes the manifold 230 and the flow control valve 300. The sprinkler system 1300 can be implemented as an electrically controlled sprinkler system, such as for operating the flow control valve 300 responsive to an electronic control signal received from a fire detector or fire control panel that generates the electronic control signal responsive a fire condition.

The manifold 230 includes a valve 1304. The valve 1304 can be a solenoid valve that can switch from a closed state to an open state responsive to receiving the electronic control signal. The valve 1304 can be biased to the closed state. The valve 1304 can provide a flow path for fluid in the valve actuator 240 to at least partially flow out of the valve actuator 240, rather than towards or into the diaphragm chamber of the flow control valve 300, enabling pressure in the diaphragm chamber 625 to decrease to trigger operation of the flow control valve 300.

The sprinkler system 1300 can also include a valve 1306. For example, the valve 1306 can be a supervised butterfly valve that is in fluid communication with the inlet port 220 and the fluid supply 116. If service on the sprinkler system 1300 is needed, the valve 1306 can be turned, or otherwise actuated, into a closed position, thereby preventing the fluid supply 116 from being in direct fluid communication with the inlet port 220, without cutting off water pressure to the valve actuator 240.

The valve 1304 can be connected with the valve actuator 240. Responsive to switching to the open state, the valve 1304 can open to connect the valve actuator 240 with a drain, allowing fluid to flow out of the valve actuator 240 to the drain and, in turn, allowing fluid in the diaphragm chamber 625 to flow to drain. As such, the valve 1304 can be electronically controlled to control operation of the flow control valve 300, including to open the flow control valve 300 responsive to an electronic fire detection signal. As depicted in FIGS. 13 and 14, the valve 1304 can be inte-grated into the manifold 230 (e.g., the housing 200 of the manifold 230 can at least partially surround components of the valve 1304 and define ports of valve 1304), enabling more compact connections of fire detectors or control panels with the flow control valve 300.

The manifold 230 can include an outlet portion 1404 on which the first fluid gauge 225 is provided. The manifold 230 can define an outlet channel 1440 that extends from a port portion 1408 that defines the ports 220, 222, 224, 226 through the outlet portion 1404. The manifold 230 can include an inlet portion 1412 on which the third fluid gauge 228 is provided. The manifold 230 can define an inlet channel 1444 that extends from the port portion 1408 through the inlet portion 1412. The manifold 230 can include an actuator portion 1416 on which the valve actuator 240 is located, and an actuator channel 1448 (e.g., control channel) that extends from the control port 224 through the manifold 230 and the actuator portion 1416 to the valve actuator 240. The manifold 230 can include alarm and test ports 1420, 1424, 1428 for alarm or test port connections.

As described with respect to the wet pipe sprinkler system 900, the dry pilot pipe sprinkler system 1000, and the electrically controlled sprinkler system 1300, the manifold 230 can be used in several different types of sprinkler systems. The manifold 230 can operate with flow control valves 300 of various pipe diameters. By using the same manifold 230 with various different system types, the manu-facturing, installation, and maintenance of sprinkler systems can become more uniform. For example, if the flow control valve 300 needs to be replaced in a sprinkler system, new trim can not need to be manufactured. Instead, a new flow control valve 300 can attached to the already installed manifold 230. Similarly, if any of the fluid gauges need to be replaced, new piping need not be manufactured. Instead, a new fluid gauge can be installed into the existing port.

Further, the use of the manifold 230 can lead to reduced manufacturing costs and improved quality control of sprin-kler systems. For example, a particular manifold 230 can be mass produced for every type of sprinkler system. This reduces the need to manufacture custom trim for each different type of sprinkler system, which can be costly and time consuming. Custom manufactured trim can be difficult to properly test until installed into the sprinkler system. The manifold 230 can be fully tested before being sent to the location of the sprinkler system that will utilize the manifold 230. The flow control valve 300 can be attached to the manifold 230 before being shipped, reducing the time and cost of installation.

Further, the manifold 230 can be prewired with electrical components used to connect various alarms, pressure transducers, communication devices, etc. that can be used in sprinkler systems. The manifold 230 can have standardized electrical ports that can be used for electrical components, such that the electrical component can be plugged into the electrical ports, thereby reducing the need for on-site wiring.

Figure 15:
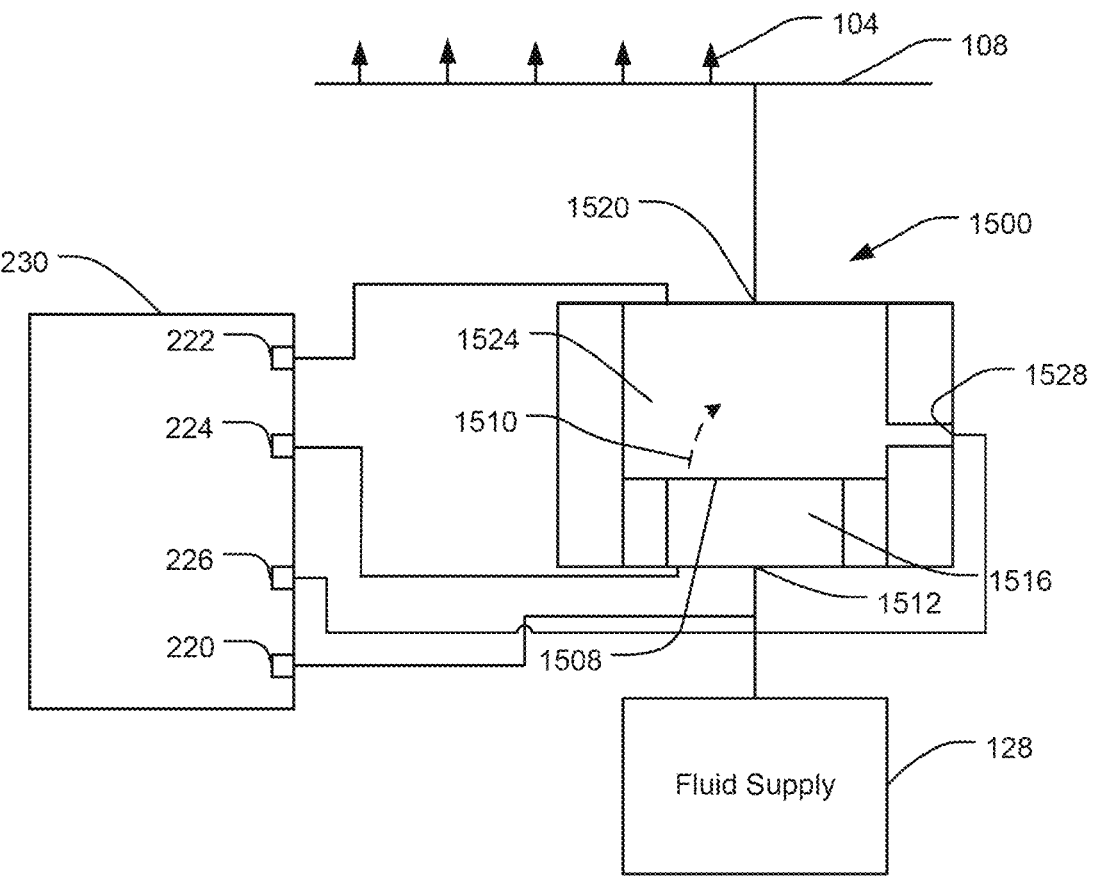
FIG. 15 is a schematic diagram of a manifold coupled with a flow control valve.

FIG. 15 depicts the manifold 230 connected with a flow control valve 1500. The flow control valve 1500 includes a movable member, such as a clapper 1508. The flow control valve 1500 can be the DPV-1 manufactured by Tyco Fire Products. The flow control valve 1500 can include an inlet port 1512 coupled with a fluid chamber 1516 (e.g., valve chamber, control chamber). The inlet port 1512 can receive fluid from the fluid supply 128. The flow control valve 1500 can include an outlet port 1520 coupled with a gas chamber 1524 (e.g., air chamber) and the at least one pipe 108.

The fluid in the fluid chamber 1516 can apply a force on the clapper 1508 in a direction towards the gas chamber 1524, and the gas chamber 1524 can apply a force on the clapper 1508 in a direction towards the fluid chamber 1516. As depicted in FIG. 15, the clapper 1508 can be held in a first position that prevents fluid from flowing from the fluid chamber 1516 through the gas chamber 1524 based on these forces. The clapper 1508 can be biased to the first position (e.g., using a spring). When pressure in the gas chamber 1524 decreases (e.g., due to the at least one sprinkler 104 opening) below a threshold (e.g., a threshold corresponding to the force applied by the fluid acting on the clapper 1508), the clapper 1508 can be moved away from the fluid chamber 1516, such as to rotate in the direction 1510, allowing fluid to flow from the fluid supply 128 through the flow control valve 1504 and into the at least one pipe 108. The flow control valve 1504 can include an alarm port 1528 that can be used to indicate an alarm condition. As depicted in FIG. 15, the alarm port 226 of the manifold 230 can connect with the alarm port 1528. The control port 224 can connect with the fluid chamber 1516. The outlet port 222 can connect with the gas chamber 1524. A connection can also be provided between the inlet port 220 and the inlet port 1512.

Figure 16:
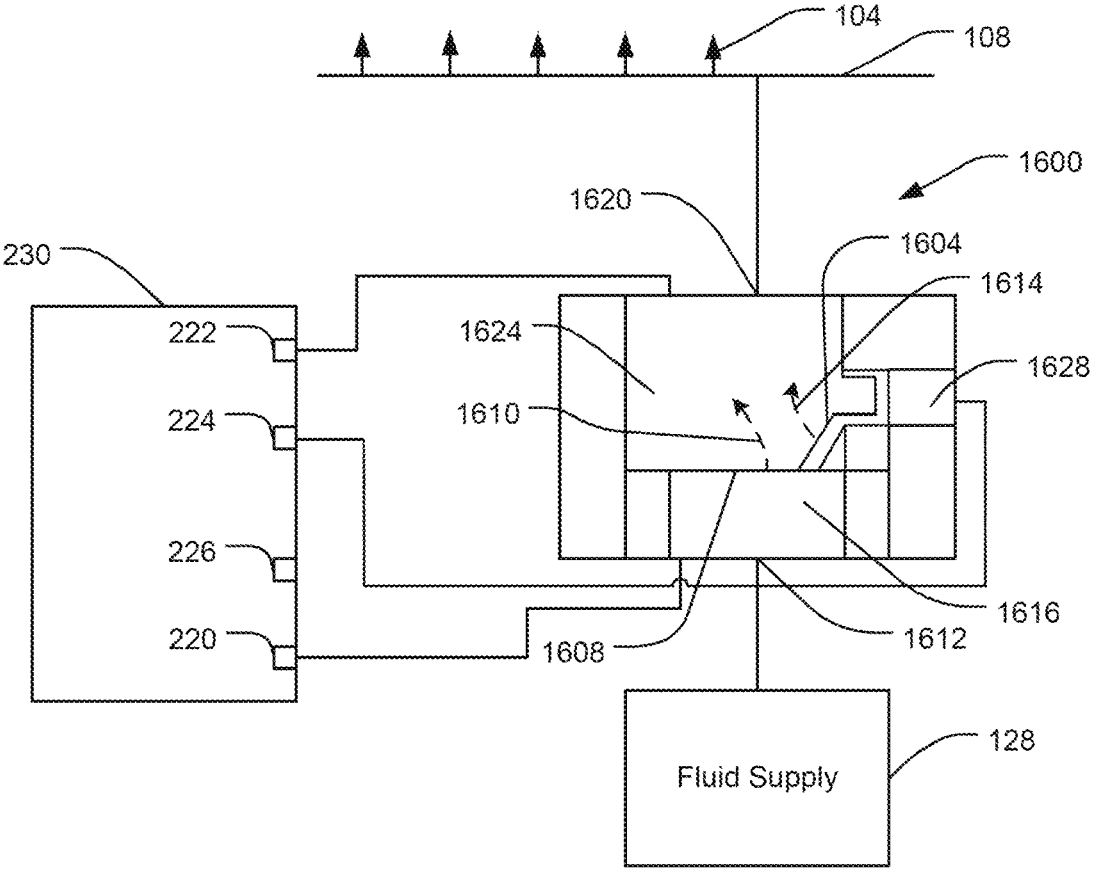
FIG. 16 is a schematic diagram of a manifold coupled with a flow control valve.

FIG. 16 depicts the manifold 230 connecting with a flow control valve 1600. The flow control valve 1600 can incorporate features of the flow control valve 1500 described with reference to FIG. 15. The flow control valve 1600 can include a movable member 1608, such as a clapper, that is coupled with a latch 1604. The flow control valve 1600 can include an inlet port 1612 coupled with an inlet chamber 1616. The inlet port 1612 can receive fluid from the fluid supply 128. The flow control valve 1600 can include an outlet port 1620 coupled with an outlet chamber 1624 and the at least one pipe 108 to enable fluid communication between the at least one pipe 108 (and the sprinklers 104) and the outlet chamber 1624.

The fluid in the inlet chamber 1616 can apply a force on the clapper 1608 in a direction towards the outlet chamber 1624, and fluid (e.g., air, water) in the outlet chamber 1624 can apply a force on the clapper 1608 in a direction towards the inlet chamber 1616. The latch 1604 can apply a force on the clapper 1608 in a direction towards the inlet chamber 1616. As depicted in FIG. 16, the clapper 1608 can be held in a first position that prevents fluid from flowing from the inlet chamber 1616 through the gas chamber 1624 based on these forces. The latch 1604 can be biased to latch the clapper 1608 in the first position (e.g., using a spring).

The inlet port 220 can connect with the inlet port 1612, the outlet port 222 can connect with the outlet port 1620, and control port 224 can connect with a control chamber 1628

(e.g., diaphragm chamber). The flow control valve 1600 can include an alarm port (not shown) to connect with the alarm port 226. Responsive to a decrease in pressure in the connection between the control port 224 and the control chamber 1628 (e.g., based on various operations of the manifold 230 described herein, such as operation of the valve actuator 240), fluid can drain out of the control chamber 1628, causing pressure to decrease in the control chamber 1628. Responsive to pressure in the control chamber 1628 decreasing below a threshold pressure (which can relate to various forces, such as pressure in the chambers 1616, 1624 and from a biasing member coupled with the latch 1604), the latch 1604 can move in the direction 1614, releasing the clapper 1608 to allow the clapper 1608 to move in the direction 1610 to couple the inlet chamber 1616 with the outlet chamber 1624 to allow fluid to flow from the fluid supply 128 through the flow control valve 1600 to the sprinklers 104.

Figure 17:
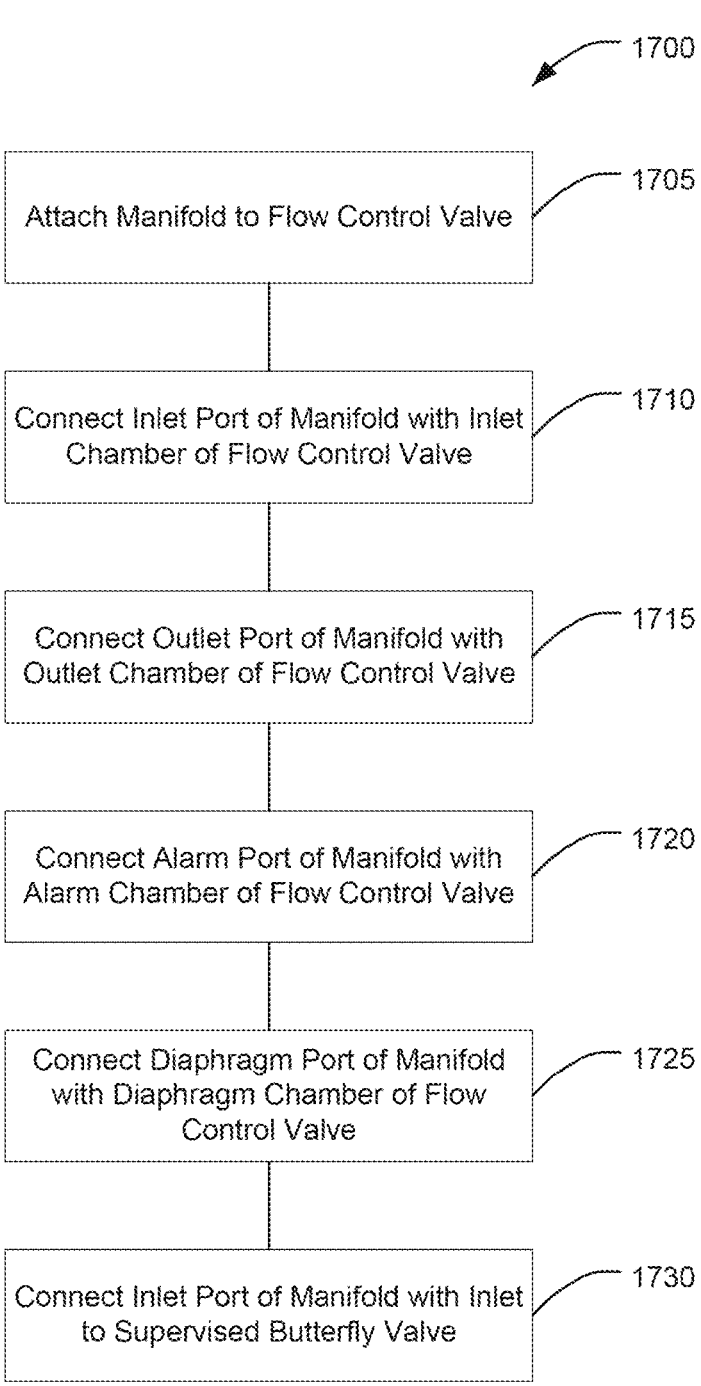
FIG. 17 is a flow diagram of a method of operating a manifold with a flow control valve.

FIG. 17 depicts a method 1700 for operating a sprinkler system that includes a manifold and a flow control valve. The method 1700 can be performed using various devices and components described herein, including but not limited to the manifold 230, the flow control valve 300, the flow control valve 1500, and the flow control valve 1600.

At 1705, a manifold is attached to a flow control valve. The manifold can be attached by coupling attachment members such as bolts or screws with the manifold and with the flow control valve, which can include coupling the attachment members with respective mounting holes of the manifold and the flow control valve.

At 1710, an inlet port of the manifold is coupled with an inlet chamber of the flow control valve. The inlet port can be adjacent to the mounting holes, and coupled with an inlet channel that extends through the manifold to be connected with a trim pipe on an opposite side of the manifold from the inlet port. The inlet chamber can be coupled with or defined by an inlet of the flow control valve that connects with a fluid supply. The inlet port can be coupled with a pressure gauge that can provide a pressure of fluid in the inlet chamber of the flow control valve due to the connection of the inlet port and the inlet chamber.

At 1715, an outlet port of the manifold is coupled with an outlet chamber of the flow control valve. The outlet port can be adjacent to the mounting holes or in proximity to the inlet port, and coupled with an outlet channel that extends through the manifold to be connected with a trim pipe on an opposite side of the manifold from the outlet port. The outlet chamber can be coupled with or defined by an outlet of the flow control valve that connects with a pipe of a sprinkler system to provide fluid to one or more sprinklers of the sprinkler system. The inlet port can be coupled with a pressure gauge that can provide a pressure of fluid in the inlet chamber of the flow control valve due to the connection of the inlet port and the inlet chamber.

At 1720, an alarm port of the manifold is coupled with an alarm chamber of the flow control valve. The alarm port can be adjacent to the mounting holes or in proximity to the inlet port and the outlet port, and coupled with an alarm channel that extends through the manifold to be connected with a trim pipe on an opposite side of the manifold from the alarm port. The alarm port can be used to communicate a pressure of fluid in the alarm chamber, such as to indicate operation of the flow control valve.

At 1725, a control chamber port of the manifold is coupled with a diaphragm chamber of the flow control valve. The diaphragm chamber can include a diaphragm that moves from a first position to seal the inlet from the outlet to a second position to allow from the inlet to the outlet, depending on pressure applied to the diaphragm. The manifold can include a valve actuator coupled with the control chamber port. Responsive to operation of the valve actuator (e.g., by allowing fluid to drain from the valve actuator), pressure applied on the diaphragm can decrease, allowing the diaphragm to move to the second position. The valve actuator can be controlled using various components, such as pilot actuators or solenoid valves, depending on the mode of operation in which the flow control valve is to operate.

At 1730, the inlet port of the manifold is connected to a supervised butterfly valve. The supervised butterfly valve can also be in fluid communication with the fluid supply. The supervised butterfly valve can not be used in every sprinkler system, such as the sprinkler systems depicted in FIGS. 9-12. Some sprinkler systems, such as the systems depicted in FIGS. 13 and 14, can include a supervised butterfly valve that can be closed if service work is being performed on the flow control valve.

As utilized herein, the terms "approximately," "about," "substantially", and similar terms are intended to include any given ranges or numbers +/−10%. These terms include insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining can be stationary (e.g., permanent or fixed) or moveable (e.g., removable or releasable). Such joining can be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling can be mechanical, electrical, or fluidic.

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element can be either X, Y, Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

References herein to the positions of elements (e.g., "top," "bottom," "above," "below") are merely used to describe the orientation of various elements in the FIGURES. It should be noted that the orientation of various elements can differ according to other exemplary embodiments, and that such variations are intended to be encompassed by the present disclosure.

The construction and arrangement of the fitting assembly as shown in the various exemplary embodiments is illustrative only. Additionally, any element disclosed in one embodiment can be incorporated or utilized with any other embodiment disclosed herein. Although only one example of an element from one embodiment that can be incorporated or utilized in another embodiment has been described above, it should be appreciated that other elements of the various embodiments can be incorporated or utilized with any of the other embodiments disclosed herein.

What is claimed is:

1. A manifold, comprising:
a housing comprising a first face, a first lateral side, and a second lateral side, the first face between the first lateral side and the second lateral side;
a valve actuator on the first face of the housing, the valve actuator between the first lateral side and a center of the first face;
an inlet channel that extends through the housing to an inlet port on the first face, the inlet port between the center and the second lateral side, the inlet port to connect with an inlet chamber of a flow control valve;
an outlet channel that extends through the housing to an outlet port on the first face, the outlet port between the center and the second lateral side, the outlet port to connect with an outlet chamber of the flow control valve;
an alarm channel that extends through the housing to an alarm port on the first face, the alarm port between the center and the second lateral side, the alarm port to connect with an alarm chamber of the flow control valve; and
a control channel that extends through the housing to a control port in fluid communication with the valve actuator, the control port between the center and the second lateral side, the control port to connect with a control chamber of the flow control valve.

2. The manifold of claim 1, comprising:
a plurality of gauges on the first face of the housing, the plurality of gauges including a pressure gauge connected with the control port to provide a pressure of fluid in the control chamber.

3. The manifold of claim 1, comprising:
an air pressure gauge to connect with a pipe of a dry pipe sprinkler system to provide a pressure of air in the pipe.

4. The manifold of claim 1, comprising:
a pilot actuator to connect with a sprinkler system, the pilot actuator coupled with the valve actuator to trigger operation of the valve actuator responsive to a pressure drop in the sprinkler system.

5. The manifold of claim 1, comprising:
a pilot actuator coupled with the valve actuator to trigger operation of the valve actuator responsive to a pressure drop, the valve actuator is between the pilot actuator and the control port.

6. The manifold of claim 1, comprising:
the valve actuator comprises:
a plunger and a seal to couple with the flow control valve; and
a button coupled to the manifold and in communication with the plunger and the seal to drive the plunger.

7. The manifold of claim 1, comprising:

a plurality of mounting holes to couple the manifold with the flow control valve, the plurality of mounting holes defined in the first face of the housing, the plurality of mounting holes proximate the first lateral side relative to the second lateral side.

8. The manifold of claim 1, comprising:

a solenoid valve coupled with the valve actuator to cause operation of the valve actuator responsive to an electronic control signal.

9. The manifold of claim 1, comprising:

a solenoid valve coupled with the valve actuator, the valve actuator is between the solenoid valve and the control port.

\* \* \* \* \*